US012136404B2

(12) United States Patent
Lyles

(10) Patent No.: US 12,136,404 B2
(45) Date of Patent: Nov. 5, 2024

(54) STRING TENSIONER FOR MUSICAL INSTRUMENT

(71) Applicant: Cosmos Lyles, New York, NY (US)

(72) Inventor: Cosmos Lyles, New York, NY (US)

( * ) Notice: Subject to any disclaimer, the term of this patent is extended or adjusted under 35 U.S.C. 154(b) by 235 days.

(21) Appl. No.: 17/663,598

(22) Filed: May 16, 2022

(65) Prior Publication Data

US 2022/0277711 A1 Sep. 1, 2022

Related U.S. Application Data

(63) Continuation of application No. 17/099,775, filed on Nov. 16, 2020, now Pat. No. 11,335,305.

(60) Provisional application No. 62/936,292, filed on Nov. 15, 2019.

(51) Int. Cl.

| | |
|---|---|
| ***G10D 3/147*** | (2020.01) |
| ***G10D 1/08*** | (2006.01) |
| ***G10D 3/12*** | (2020.01) |

(52) U.S. Cl.

CPC ............ *G10D 3/147* (2020.02); *G10D 1/085* (2013.01); *G10D 3/12* (2013.01)

(58) Field of Classification Search

CPC .. G10D 3/12; G10D 1/08; G10D 3/04; G10D 3/153

See application file for complete search history.

(56) References Cited

U.S. PATENT DOCUMENTS

| | | | |
|---|---|---|---|
| 936,624 | A | 10/1909 | Hale |
| 1,113,390 | A | 10/1914 | Wenzel-Schmidt |
| 1,253,550 | A | 1/1918 | Wilkins |
| 1,416,568 | A | 5/1922 | Mazzocco |
| 2,070,916 | A | 2/1937 | Peate |
| 2,130,248 | A | 9/1938 | Peate |
| 2,262,179 | A | 11/1941 | Hammond |
| 2,514,835 | A | 7/1950 | Bredice |
| 2,736,226 | A | 2/1956 | McBride |
| 2,873,640 | A | 2/1959 | Kunz |
| 2,973,682 | A | 3/1961 | Fender |
| 3,437,001 | A | 4/1969 | Kraft |
| 3,580,525 | A | 5/1971 | Dopner |
| 4,375,180 | A | 3/1983 | Scholz |
| 4,704,935 | A | 11/1987 | Franklin |
| 4,882,967 | A | 11/1989 | Rose |
| 4,909,126 | A | 3/1990 | Skinn et al. |
| 5,095,797 | A | 3/1992 | Zacaroli |
| 5,173,565 | A | 12/1992 | Gunn |
| 5,390,579 | A | 2/1995 | Burgon |

(Continued)

FOREIGN PATENT DOCUMENTS

WO WO 2006023600 A2 3/2006

*Primary Examiner* — Kimberly R Lockett

(74) *Attorney, Agent, or Firm* — FisherBroyles, LLP; Glen L Nuttall

(57) ABSTRACT

A string tensioner is configured to apply a substantially constant tension to a string over an operational range even if such string stretches and contracts over time. Tension is provided by a spring. Flexers can attach the spring to a force modulation member and a frame. The flexers preferentially bend out-of-axis so that the spring does not bend out-of-axis when the force modulation member rotates. A dampening system can slow the force modulation member's response to vibrational forces. A flexible stop can prevent rotation of the force modulation member beyond a desired point, but flexes to remain in contact with the force modulation member over a small range of movement.

17 Claims, 26 Drawing Sheets

(56) References Cited

U.S. PATENT DOCUMENTS

| | | | |
|---|---|---|---|
| 5,567,895 | A | 10/1996 | Aspri et al. |
| RE36,484 | E | 1/2000 | Turner |
| 6,034,311 | A | 3/2000 | Fisher, IV |
| 6,084,166 | A | 7/2000 | Lee |
| 6,384,311 | B1 | 5/2002 | Cota |
| 7,339,102 | B2 | 3/2008 | Folmar et al. |
| 7,534,950 | B2 | 5/2009 | Lyles |
| 7,554,023 | B2 | 6/2009 | Tyler |
| 7,592,528 | B2 | 9/2009 | Lyles et al. |
| 7,692,079 | B2 | 4/2010 | Lyles |
| 7,888,570 | B2 | 2/2011 | Lyles et al. |
| 8,152,126 | B2 | 4/2012 | Hardtke |
| 8,440,897 | B1 | 5/2013 | Baxter |
| 8,779,258 | B2 | 7/2014 | Lyles et al. |
| 8,940,986 | B1 | 1/2015 | Edwards |
| 9,318,081 | B2 | 4/2016 | Lyles |
| 9,495,941 | B2 | 11/2016 | Stanley |
| 9,613,600 | B2 | 4/2017 | Lyles |
| 9,792,886 | B2 | 10/2017 | Lyles |
| 10,224,009 | B2 | 3/2019 | Lyles |
| 10,229,659 | B2 | 3/2019 | Lyles |
| 2003/0094087 | A1 | 5/2003 | Gregory |
| 2007/0289429 | A1 | 12/2007 | Tyler |

STRING TENSIONER FOR MUSICAL INSTRUMENT

CROSS-REFERENCE TO RELATED APPLICATIONS

This application is a continuation of U.S. application Ser. No. 17/099,775, which was filed Nov. 16, 2020, which claims priority to U.S. Application No. 62/936,292, which was filed Nov. 15, 2019. The entirety of each of these applications is hereby incorporated by reference.

BACKGROUND

The present disclosure relates to stringed musical instruments, and more specifically to a string tensioner for stringed musical instruments.

Stringed musical instruments create music when strings of the instrument vibrate at wave frequencies corresponding to desired musical notes. Such strings typically are held at a specified tension, and the musical tone emitted by the string is a function of the vibration frequency, length, tension, material and density of the string. These parameters must be maintained to keep the instrument in appropriate tune. Typically, musical strings go out of tune because of variation in string tension. Such tension changes commonly occur when, for example, the string stretches and slackens over time. Tension can also change due to atmospheric conditions such as temperature, humidity, and the like.

Tuning a stringed instrument is a process that can range from inconvenient to laborious. For example, tuning a piano typically is a very involved process that may take an hour or more. Tuning a guitar is not as complex; however, it is inconvenient and can interfere with play and/or performance.

Applicant's previous patents, such as U.S. Pat. No. 8,779,258, teach a constant tension device that uses one or more springs to maintain a near-constant tension on a musical string so that the string will not go out of tune despite changing conditions. The musical string is connected to a force modulation member, which is also connected to a spring. As the length of the musical string changes, the force modulation member rotates, as does the spring. The lever arm upon which spring force is applied to the force modulation member correspondingly changes. The net result is that the tension applied to the string by the spring via the force modulation member remains relatively constant even as the tension within the spring changes. Notably, operation of such structure involves connections and the like that can lead to energy losses.

SUMMARY

The present disclosure discloses aspects that improve constant tension devices, particularly constant tension devices for stringed musical instruments. For example, some embodiments disclose structure that connects springs to parts of the constant tension device in a manner so that, even when the springs are rotated, such springs deflect substantially only in an axial direction, avoiding out-of-axis bending. Some embodiments disclose structure that avoids excessive bending of the musical string upon rotation of the force modulation member. Still further embodiments disclose structure providing a rotation stop that stops further rotation of the force modulation member, but is flexible, and avoids possible separation (and consequential buzzing) during engagement of the stop. Yet other embodiments disclose a saddle structure that is rotatable with substantially little to no friction. Still other embodiments disclose structure for preserving resonance in the sounding portion of the musical string by reducing movement of the force modulation member during such resonance.

In accordance with one embodiment, the present disclosure provides a spring alignment device, comprising a first mount and a second mount; an elongated spring member having a spring axis, a first spring mount and a second spring mount, elongated spring member configured to exert a tension along the spring axis; and the first mount being attached to the first spring mount via an elongated flexer, and the second mount being attached to the second spring mount via an elongated flexer so that the elongated spring member is held in tension between the first and second mounts. The elongated flexers are each configured to bend in a direction out of the spring axis more readily than will the elongated spring member so that the entire length of the elongated spring member is substantially aligned with the spring axis.

In some such embodiments, the elongated spring member is an elongated coil spring.

In accordance with another embodiment, the present specification provides a string tensioner for a stringed musical instrument, comprising a frame; a spring modulation member configured to pivot relative to the frame, the spring modulation member having an arm and a string holder; an elongated coil spring having a first end attached to the arm and a second end attached to the frame so that as the spring modulation member pivots, the coil spring elongates or contracts and a lever arm of the coil spring relative to the spring modulation member simultaneously changes, the elongated coil spring having an axis; a first elongated flexer extending between the arm and the coil spring; and a second elongated flexer extending between the frame and the coil spring. The first and second elongated flexers are selected to bend in a direction out of the spring axis more readily than will the coil spring so that the entire length of the coil spring is substantially aligned with the spring axis.

In some such embodiments, the frame comprises a view slot having a front surface and a back surface, and the spring force modulation member comprises an indicator portion viewable within the view slot. A length of the view slot between the front and back surfaces can be selected so that there is substantially no audible change in the tune of the musical string when the indicator portion moves within the view slot between the front and back surfaces during stretching and contracting of the string.

In accordance with yet another embodiment, the present specification provides a string tensioner for a stringed musical instrument, comprising a frame; a spring modulation member configured to pivot relative to the frame, the spring modulation member having an arm and a string holder configured to connect to a musical string; an elongated coil spring having a first end attached to the arm and a second end attached to the frame so that as the spring modulation member pivots, the coil spring elongates or contracts and a lever arm of the coil spring relative to the spring modulation member simultaneously changes, the elongated coil spring having an axis; a body of the spring modulation member having an arcuate surface; and an elongated flexer extending between the body of the spring modulation member and the string holder, the elongated flexer configured to readily bend so as to conform to the arcuate surface of the body. The string tensioner is configured so that when a tension is applied to the string holder by a musical string, a portion of the elongated flexer bends to conform to the arcuate surface of the body so that the string holder is positioned to hold the musical string in a position extending tangentially from the arcuate surface of the body.

In accordance with yet another embodiment, the present specification provides a string tensioner for a stringed musical instrument, comprising a frame supporting a flexible stop; a spring modulation member configured to pivot relative to the frame, the spring modulation member having an arm, a string holder configured to connect to a musical string and a stop body having a bumper; and an elongated coil spring extending between the arm and the frame. The string tensioner is configured so that when a tension is applied to the string holder by a musical string the spring modulation member is pivoted so that the bumper of the stop body engages the flexible stop and the flexible stop flexes over a range before preventing further pivoting of the spring modulation member.

In accordance with still another embodiment, the present specification provides a musical string saddle assembly for a stringed musical instrument, comprising a support base defining a base cavity; a saddle body configured to fit within and be vertically movable within the base cavity, the saddle body comprising a musical string receiver; a height adjustment member configured to selectively move the saddle body vertically relative to the support base while the support base remains within the base cavity; and a saddle pivot configured to pivotably engage a surface of the stringed musical instrument. The musical string saddle assembly can be configured to be pivotable relative to the surface of the string musical instrument and about the saddle pivot.

In accordance with still another embodiment, the present specification provides a string tensioner for a stringed musical instrument, comprising a frame; a force modulation member configured to pivot relative to the frame, the force modulation member having an arm and a string holder configured to connect to a musical string. A spring is attached to the arm so that force from the spring is communicated to the string via the force modulation member. A dampener is provided to slow response of the force modulation member to forces tending to rotate the force modulation member.

DESCRIPTION

The following description presents embodiments illustrating inventive aspects of the present invention. It is to be understood that various types of musical instruments can be constructed using aspects and principles as described herein, and embodiments are not to be limited to the illustrated and/or specifically-discussed examples, but may selectively employ various aspects and/or principles disclosed in this application. For example, for ease of reference, embodiments are disclosed and depicted herein in the context of a four-string bass guitar. However, principles discussed herein can be applied to other stringed musical instruments such as, for example, violins, harps, and pianos. Similarly, principles discussed herein can be applied to constant tension devices for various uses, including uses other than in connection with stringed musical instruments.

Figure 1:
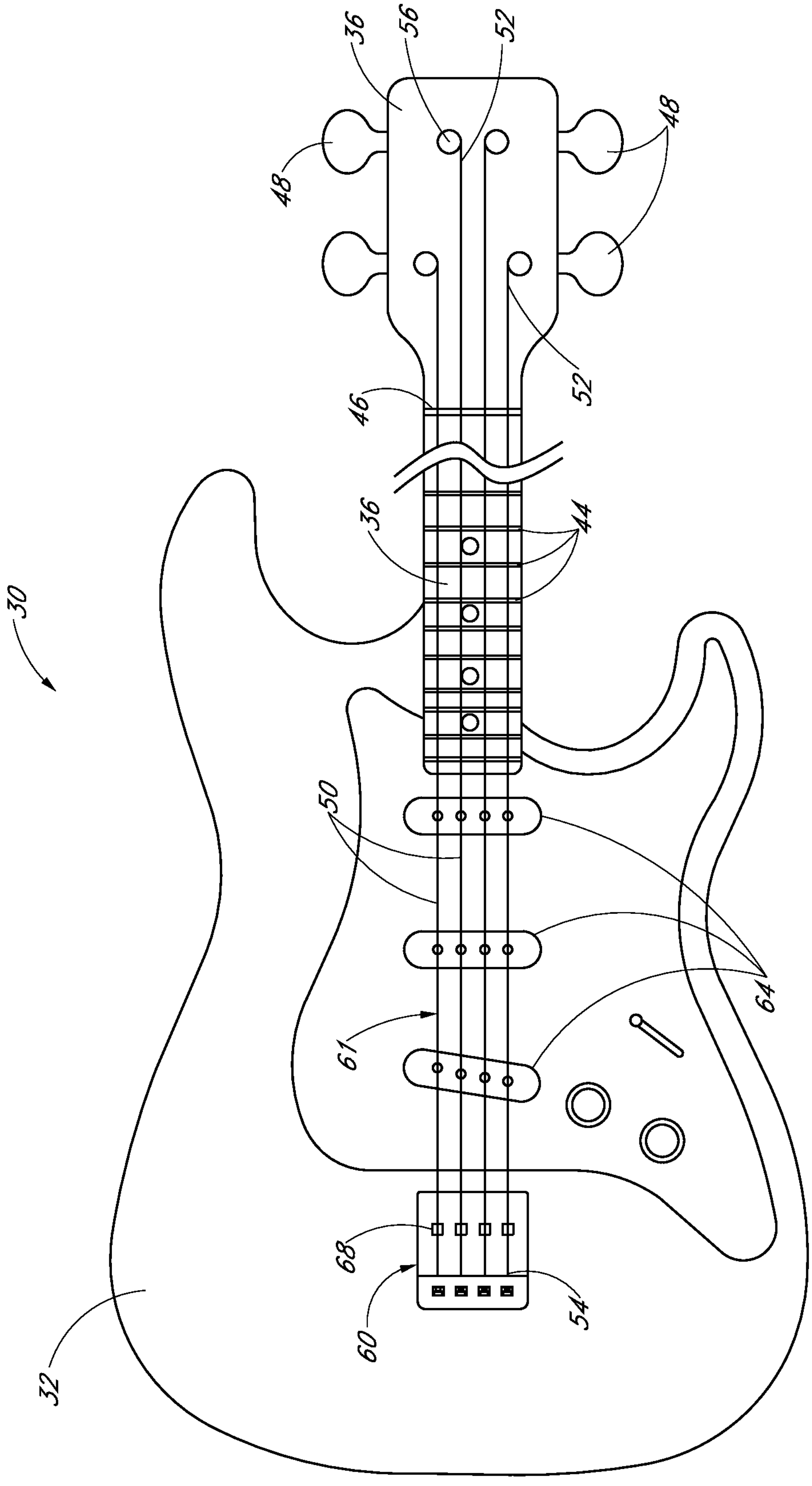
FIG. 1 is a schematic view of a guitar configured in accordance with an embodiment.

With initial reference to FIG. 1, a guitar 30 is illustrated. The guitar 30 comprises a body 32, an elongate neck 34, and a head 36. The neck 34 extends from the body 32 to the head 36. A plurality of frets 44 are disposed on the neck 34, and a nut 46 is arranged generally at the point when the neck 34 joins with the head 36. Tuning knobs 48 are disposed on the head 36. Musical strings 50 are also provided, each having first and second ends 52, 54. The first end 52 of each string 50 is attached to an axle 56 of a corresponding tuning knob 48, and at least part of the string 50 is wrapped about the tuning knob axle 56. Each string 50 is drawn from the tuning knob 48 over the nut 46, and is suspended between the nut 46 and a string tensioner 60 disposed on a front face of the body 32. The second end 54 of each musical string 50 is attached to the string tensioner 60. The suspended portion of the string 50, when vibrated, generates a musical note and can be defined as a playing zone 61 or sounding portion of the strings.

The illustrated embodiment is an electric guitar 30, and additionally provides a plurality of pickups 64, which include sensors adapted to sense the vibration of the strings 50 and to generate a signal that can be communicated to an amplifier. Controllers such as for volume control and the like can also be disposed on the body 32 of the guitar 30.

In the embodiment illustrated in FIG. 1, the string tensioner 60 is depicted schematically. Applicants anticipate that string tensioners having various structures can be employed with such a guitar 30.

Figure 2:
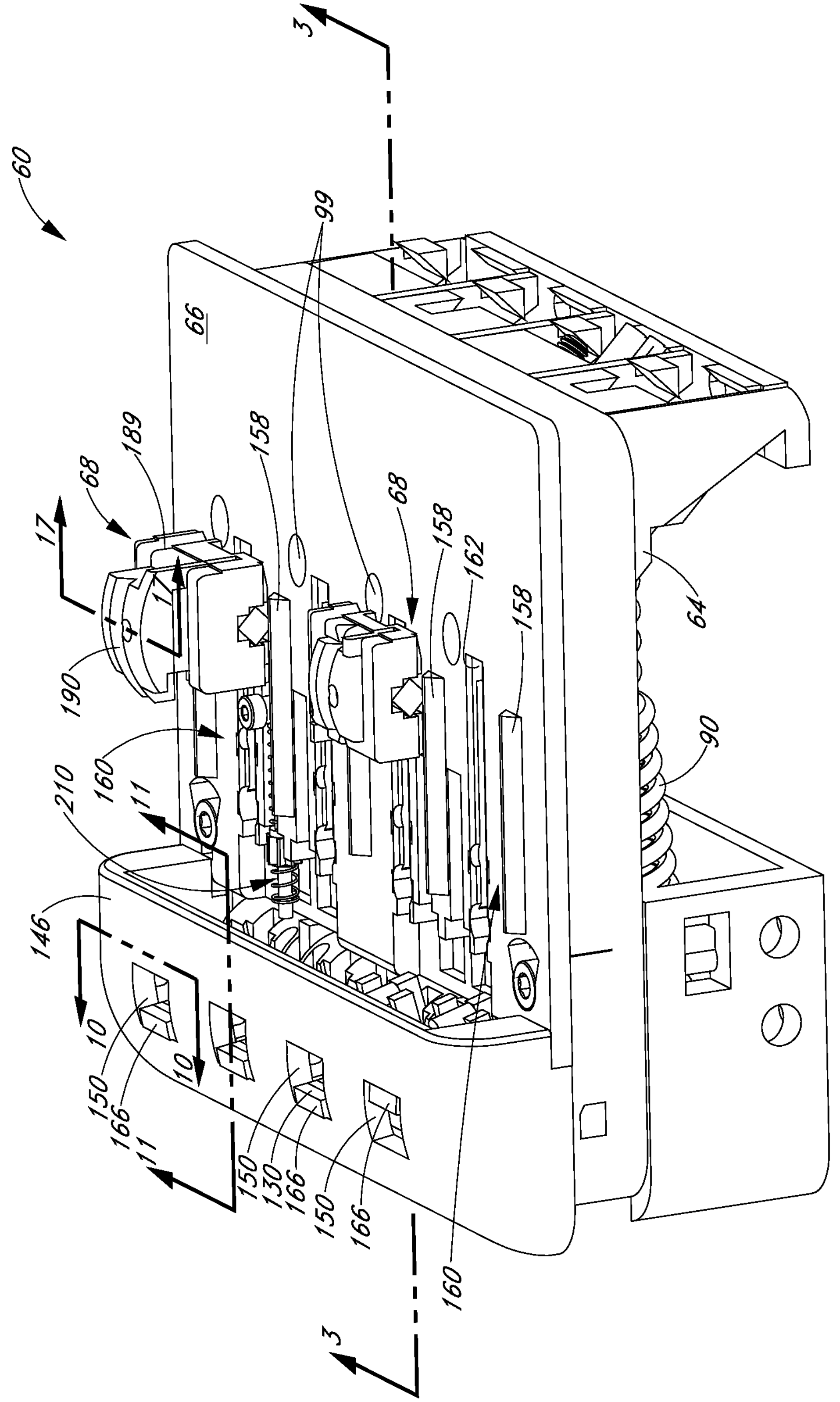
FIG. 2 is a perspective view of a string tensioner configured in accordance with an embodiment.
Figure 3:
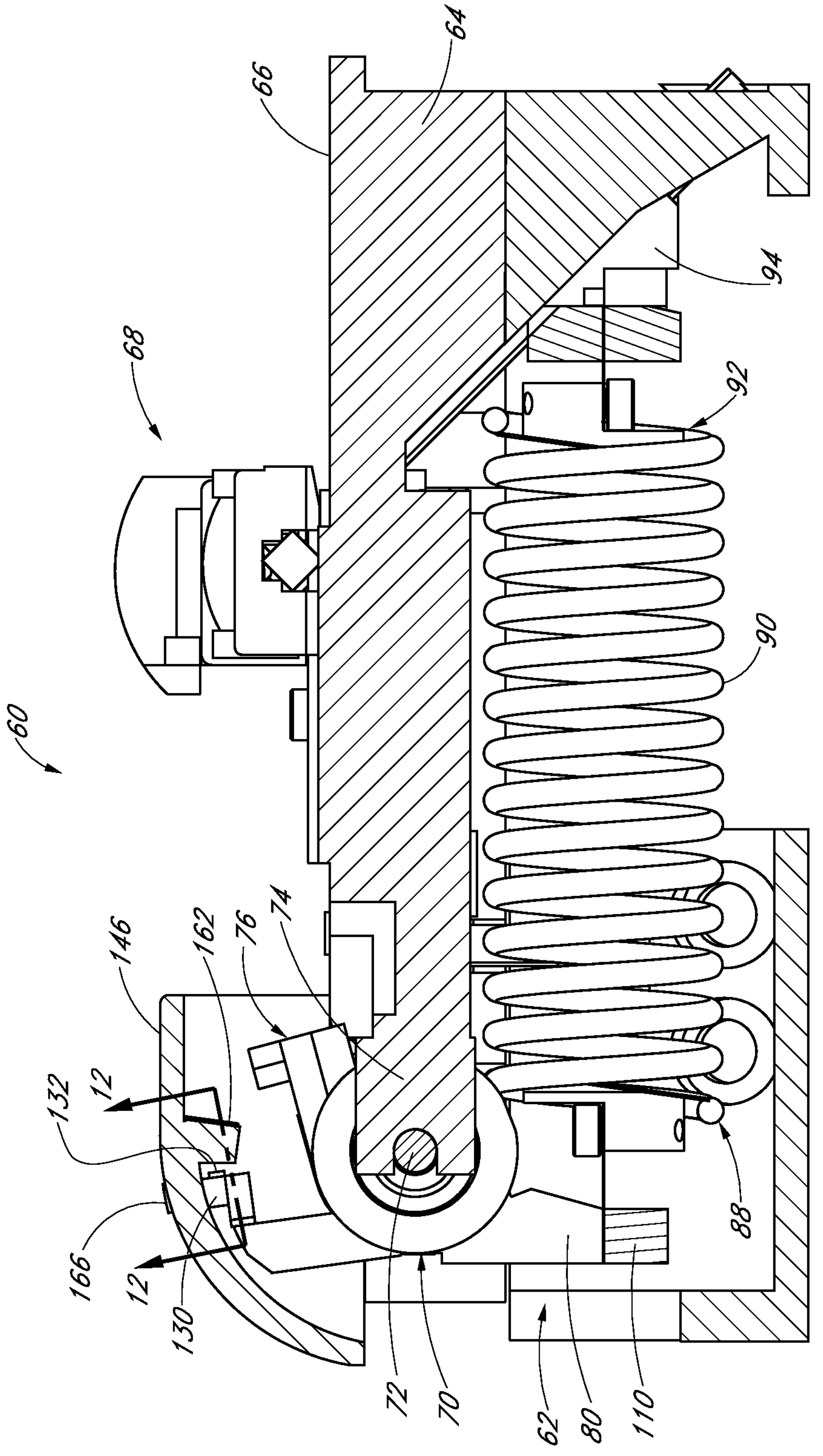
FIG. 3 is a cross-sectional view taken along line 3-3 of FIG. 2.

With reference next to FIGS. 2 and 3, an embodiment of a string tensioner 60 is presented. The illustrated string tensioner is configured to support four string holder assemblies 62, with each assembly configured to hold a single musical string 50. To avoid clutter, some components of some of the assemblies have been removed in the illustrated embodiment.

As shown, the string tensioner 60 comprises a frame 64 configured to support the assemblies 62, and to be mounted in the body of a musical instrument such as a guitar. The frame 64 includes a frame surface 66, which is configured to support four saddle assemblies 68.

As shown in FIG. 3, each string holder assembly 62 comprises a spring force modulation member 70 configured to rotate, or pivot, about an axle 72 supported by an axle support 74 of the frame 64. A string holder 76 is attached to the modulation member 70 and is configured to hold an end of a musical string (not shown), which extends over and is supported by a selectively-movable saddle. An arm 80 of the modulation member 70 connects to a first end 88 of a coil spring 90, which is connected at its opposing second end 92 to the frame 64 via a movable shuttle 94. As discussed in more detail in Applicant's U.S. Pat. Nos. 8,779,258 and 10,224,009, the entirety of both of which are hereby incorporated by reference, when the musical string elongates or contracts, the spring 90 correspondingly lengthens or contracts, and also the spring position changes. As such, the line of action of the spring 90 changes, correspondingly changing a lever arm of the spring 90 relative to the axle 72. This changing lever arm effectively compensates for changes in the force exerted by the spring 90 as it lengthens or contracts. In this manner, and as discussed in more detail in the documents that are incorporated by reference, the tension applied by the spring 90 to the string via the force modulation member 70 remains near-constant over an operation range of string length change even though the spring force exerted by the spring 90 changes with its changing length.

Figure 4:
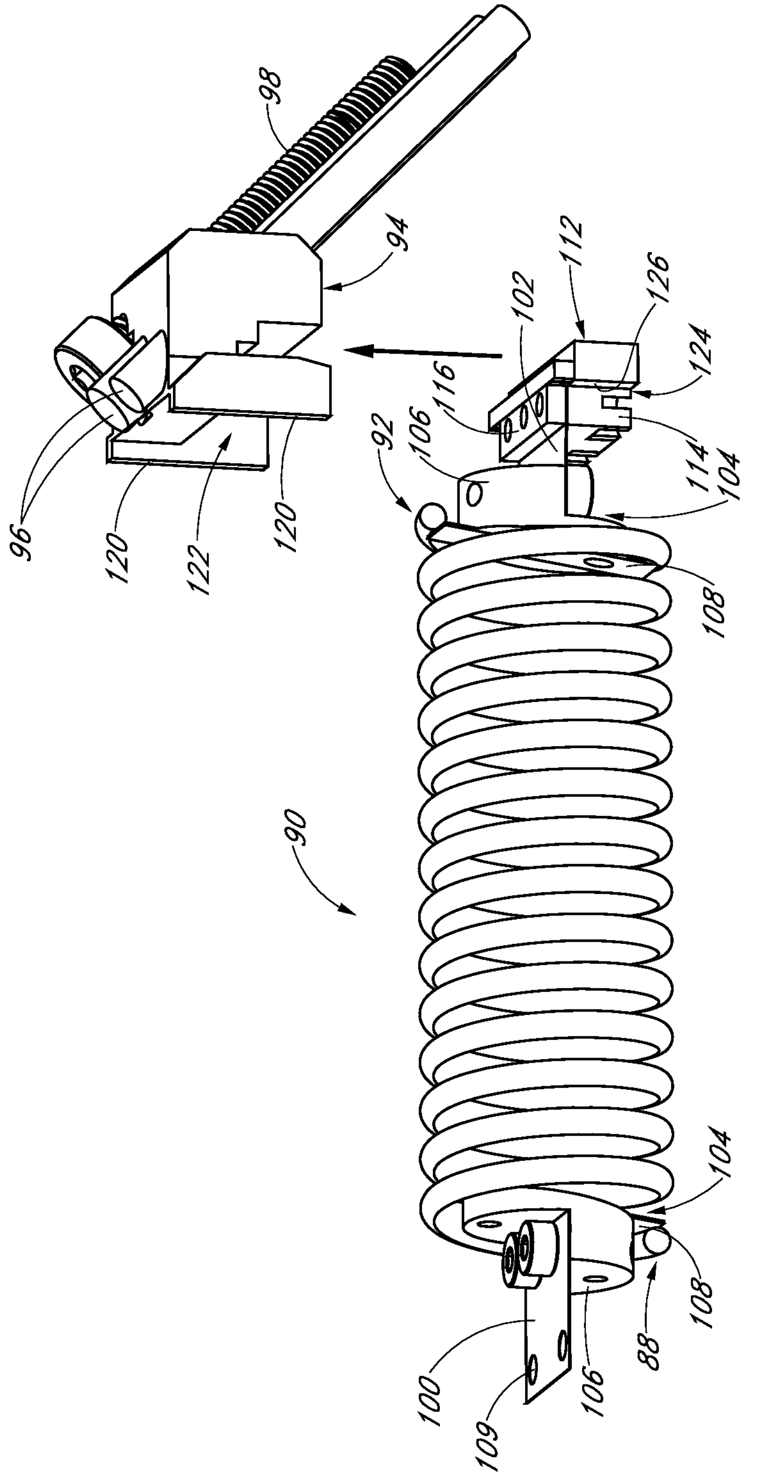
FIG. 4 is a perspective view of a spring assembly and shuttle assembly of the arrangement in FIG. 2.

With additional reference to FIG. 4, a pair of elongated guides 96 are supported by the frame 64, and the shuttle 94 is configured to slide over the elongated guides 96. An adjustment bolt 98 is also supported by the frame 64 and is threadingly connected to the shuttle 94. As such, when the adjustment bolt 98 is rotated, the shuttle 94 is moved linearly along the elongated guides 96. An adjustment bolt access hole 99 is formed through the frame surface 66 to provide access to each adjustment bolt 98. As such, a user can advance a tool into the access hole to rotate the adjustment bolt 98 in order to place the shuttle 94—and thus the angle of the spring 90—as desired.

Preferably, tuning of a guitar string is accomplished by adjusting the shuttle position. First, the musical string 50 is tightened via with the tuning knobs 48. The user will then rotate the adjustment bolt 98 to position the shuttle 94 (and thus the associated spring 90) so that the corresponding string 50 is in tune. Once the string is in tune, stretching and contracting of the string 50 over an operating range will be compensated-for by the rotating force modulation member 70 and spring 90 so that the musical string remains in tune.

During operation, an angle of the spring 90 relative to both the shuttle 94 and the modulation arm 80 changes as the modulation member 70 rotates. Due to the structure of some types of spring mounts, this can lead to friction and/or the spring 90 bending somewhat relative to its axis (particularly at and adjacent the first and second ends 88, 92 of the spring 90, which are attached to the arm 80 and shuttle 94, respectively). Thus, the spring 90 not only lengthens and contracts, but has some out-of-axis bending, which can affect the actual tension applied to the musical string 50, possibly compromising predictability and the ability to maintain near-constant string tension.

With particular reference to FIGS. 3-6, an embodiment of a spring mounting arrangement provides flexible members, or flexers 100, 102, between the spring ends and the shuttle 94 and modulation arm 80. More specifically, a first flexer 100 is disposed between the first end 88 of the spring 90 and the modulation arm 80, and a second flexer 102 is disposed between the second end 92 of the spring 90 and the shuttle 94. The flexers 100, 102 are configured to be more flexible in an out-of-axis direction than is the spring 90, but to exhibit little or no in-axis elongation when subjected to tensions within the operating range. Thus, when the modulation member 70 rotates, and the angle of the spring 90 relative to both the shuttle 94 and arm 80 changes, the flexers 100, 102 bend out of axis instead of the spring 90 so that the spring 90 deflects substantially only in tension along its length, and does not deflect substantially in bending relative to its spring axis. There is little or no friction at points of connection between the spring 90 and the arm 80 or shuttle 94.

Figure 5:
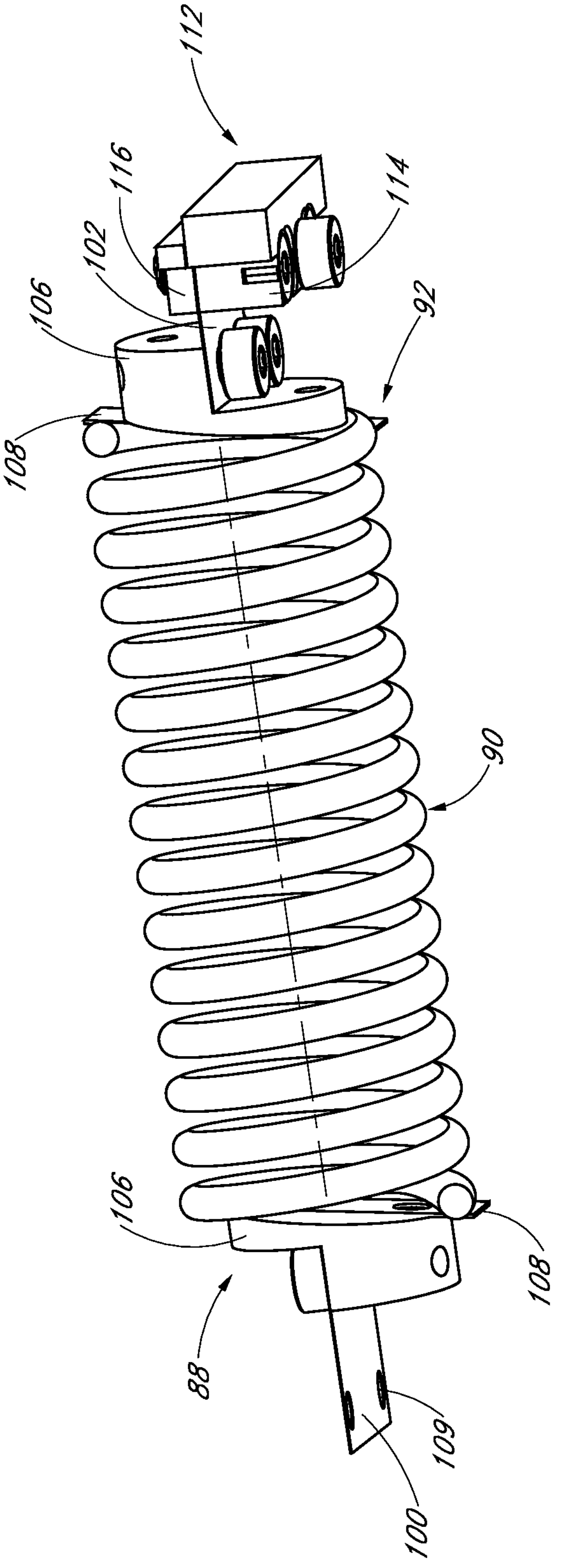
FIG. 5 is another perspective view of the spring assembly of FIG. 4.
Figure 6:
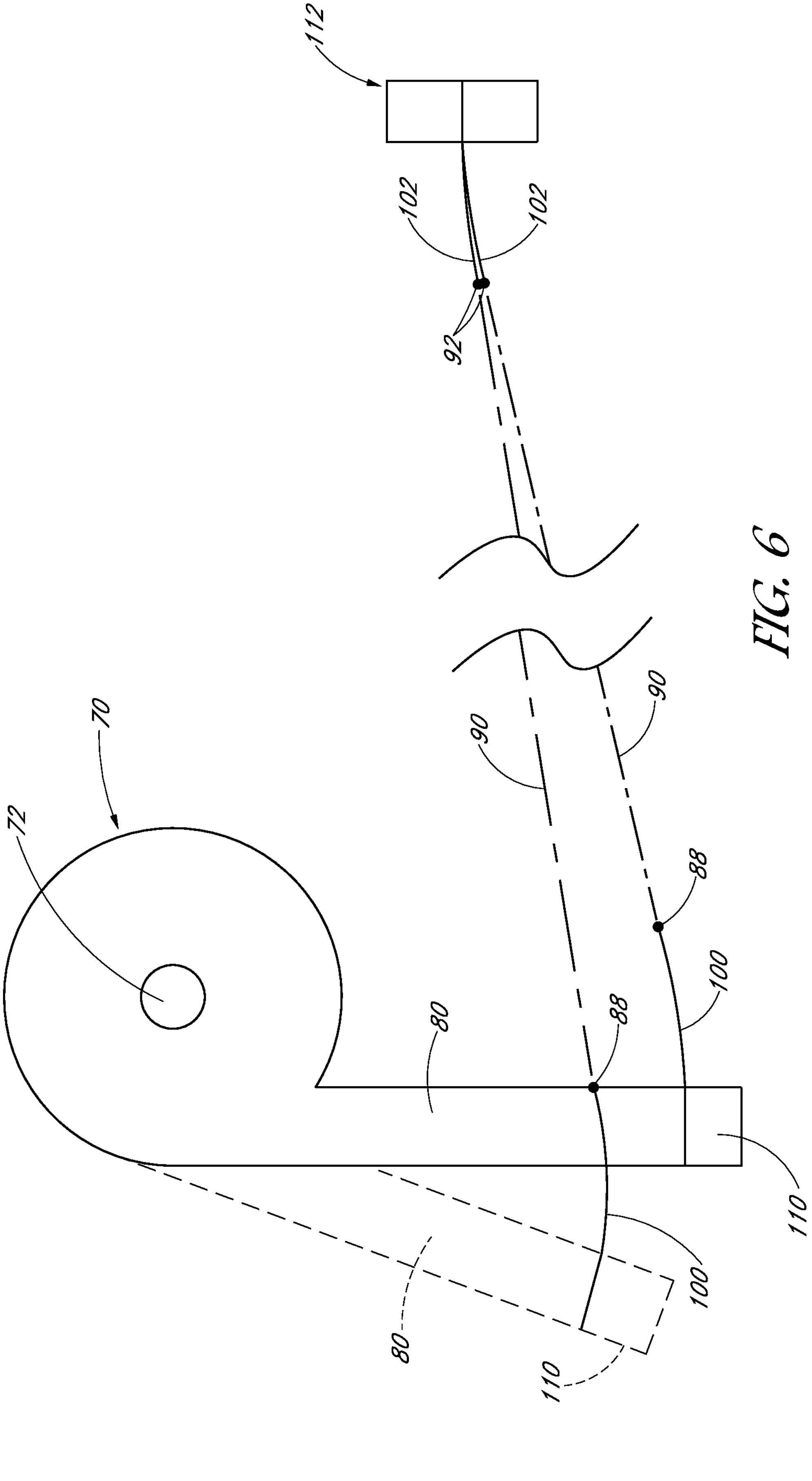
FIG. 6 is a schematic view showing operation of an embodiment of a string holder assembly moving from a first position to a second position shown in phantom.
Figure 7:
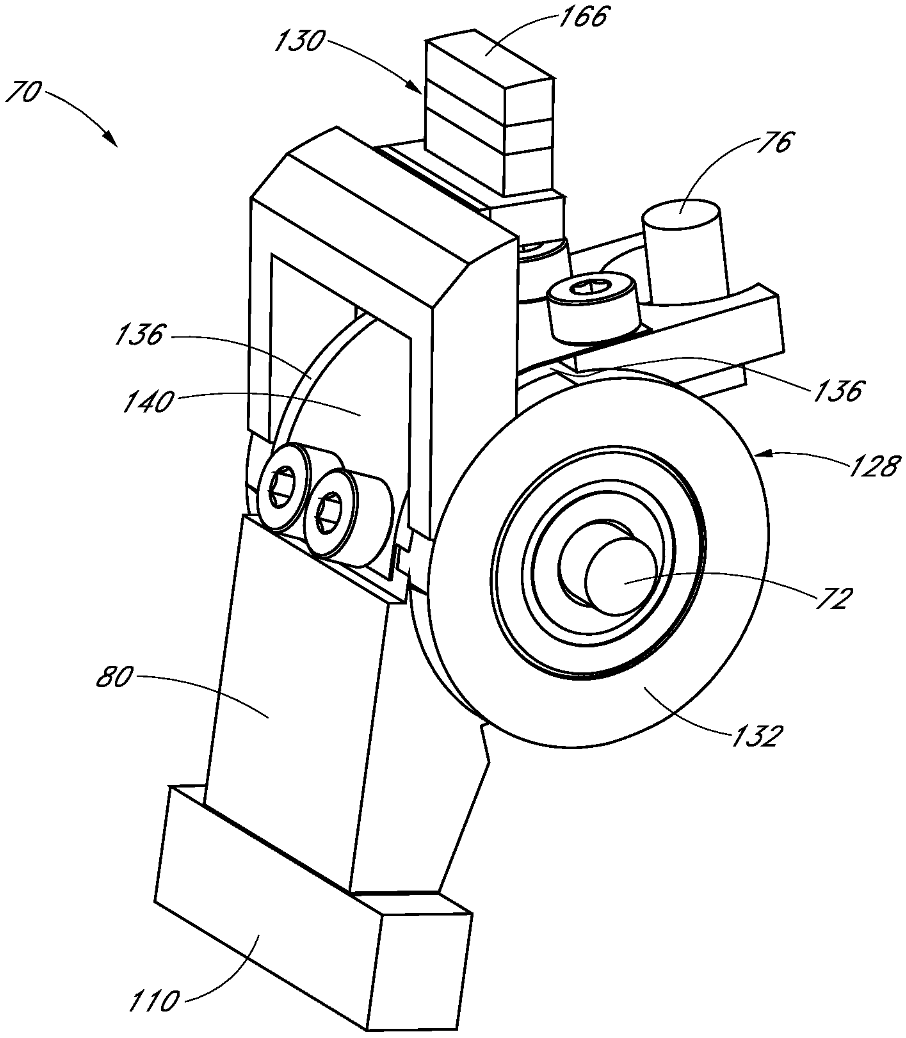
FIG. 7 is a perspective view of a force modulation member configured in accordance with an embodiment.
Figure 8:
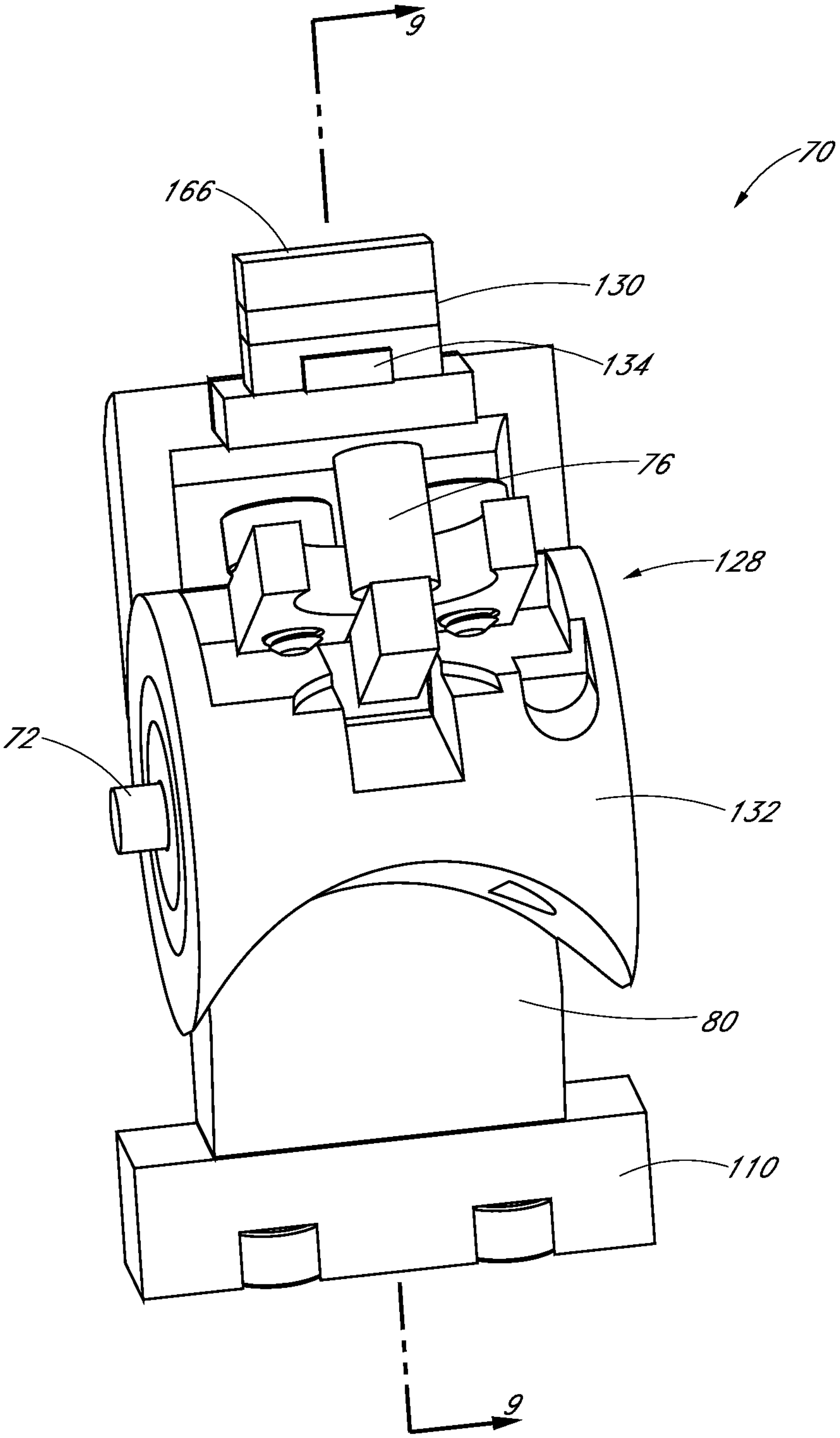
FIG. 8 is another perspective view of the force modulation member of FIG. 7.

FIGS. 5 and 6 show an embodiment of a coil spring 90 having a spring mount 104 on each of its first and second ends 88, 92. Each spring mount 104 comprises a mount body 106 to which a plate 108 is attached. The plate 108 seats behind a coil of the spring 90 so that tension applied to the mount body 106 is communicated via the plate 108 to the spring 90. As shown, a flexer is attached to each spring mount body 106.

In the illustrated embodiment, each flexer 100, 102 comprises a thin metal plate or strip configured to readily deflect or bend in an out-of-axis direction, but to not stretch upon application of tension within an operating range of the string tensioner. In a preferred embodiment the flexers are formed of a spring steel having a thickness of about 0.002-0.004 inch. In additional embodiments the flexers 100, 102 may have other structural configurations. Preferably, however, the flexers are configured to be more flexible in out-of-axis bending than is the coil spring 90 so that the flexers 100, 102 will preferentially bend, and substantially the entire length of the coil spring 90 will be straight along the spring axis notwithstanding rotation of the spring 90. Most preferably each flexer 100, 102 will bend with a substantially constant radius of curvature from the spring mount 104 to the mount of the corresponding arm 80 or shuttle 94.

In the illustrated embodiment, holes 109 are formed adjacent the ends of each flexer 100, 102, and fasteners extending through the holes attach each flexer to corresponding spring mounts 104 and arm 80 or shuttle 94.

The first flexer 100 preferably is attached to the modulation arm 80. More specifically, the end of the flexer 100 preferably is sandwiched between a clamp portion 110 and an end of the arm 80, and is secured in place with a pair of fasteners.

A shuttle mount 112 is configured to attach to the second flexer 102 so as to connect the second end 92 of the spring 90 to the shuttle 94. The illustrated shuttle mount 112 comprises a first clamp 114 and a second clamp 116. The end of the second flexer 102 is sandwiched between the first and second clamps 114, 116, which are tightened together with a pair of fasteners.

In the illustrated embodiment, the shuttle 94 comprises a pair of spaced apart retainers 120, and a key receiver 122 is defined between the retainers 120 and a shuttle body. The shuttle mount 112 comprises a keyed portion 124 that is configured to fit complementarily into the key receiver 122 of the shuttle 94 so that offset surfaces 126 of the shuttle mount engage back surfaces of the shuttle retainers 120, with the remainder of the shuttle mount 112 and the flexer 102 extending between the retainers 120. A fastener preferably attaches the shuttle mount 112 to the shuttle 94.

It is to be understood that various structures and methods can be employed to attach respective ones of the first and second flexers 100, 102 to a modulation member 70 and to a shuttle 94 or other structure associated with the frame 64.

FIG. 6 is a schematic diagram demonstrating, generally, operation of the spring 90 and flexers 100, 102 when the force modulation member 70 rotates. As shown, when the modulation member 70 is in a first position, the flexers 100, 102 both bend relative to the axis of the spring 90, while the entirety of the length of the spring between its first and second ends 88, 92 remains substantially in line with the spring axis. As such, substantially the entire force applied to the coil spring 90 is a tension force applied along the spring axis. As the modulation member 70 is rotated to a second position (shown in phantom), the flexers 100, 102 continue to bend out-of-axis, but to a differing extent than at the first position. Although the coil spring axis rotates and elongates, it does not substantially bend out-of-axis, and substantially all the spring tension remains applied along the spring axis between the first and second ends 88, 92.

In some embodiments, during rotation of the force modulation member 70 the first end 88 of the spring 90 moves substantially while the second end 92 of the spring 90 does not move or rotate much as compared to the first end 88. As such, in some embodiments the first flexer 100 can be more flexible in out-of-axis bending than is the second flexer 102. For example, in one embodiment the second flexer 102 can be made of a single plate of spring steel having a thickness of about 0.004 inch, while the first flexer 100 can be made of two plates each having a thickness of about 0.002 inch. Although both the first and second flexers 100, 102 have substantially the same resistance to in-axis elongation, the first flexer 100 can be expected to be more flexible than the second flexer 102 in out-of-axis bending. In yet further embodiments, the second end 92 of the spring 90 may be attached to the shuttle 94 via a conventional connection structure, such as a pin, axle or the like, while the first end 88 of the spring 90 is connected to the modulation arm 80 via the first flexer 100.

With reference next to FIGS. 7-9B, the illustrated spring force modulation member 70 preferably comprises a body 128 defining a bearing housing 132 supporting a pair of bearings attached to an axle 72. As such, the modulation member 70 rotates freely about the axle 72. The arm 80 extends from the body, as does a stop body 130. A bumper 134 projects from a front surface of the stop body 130. The body 128 has an arcuate top surface 136. Preferably the arcuate top surface 136 has a constant radius of curvature.

A string holder 76 is spaced from the body 128 of the modulation member 70, but is flexibly attached thereto via a holder flexer 140 that extends between the body and the string holder 76. The illustrated holder flexer 140 preferably is a thin plate or strip formed of spring steel or the like and preferably has a thickness of about 0.002-0.004 inch. The holder flexer 140 can be similar to the spring flexers 100, 102 in that the holder flexer 140 readily bends in an arcuate, out-of-axis manner so as to flexibly attach the string holder 76 to the body, but resists in-axis elongation. In the illustrated embodiment, a pair of fasteners attach one end of the holder flexer 140 to the body at the arcuate top surface 136, and a pair of fasteners attach the other end of the holder flexer 140 to the string holder 76. As shown, the illustrated holder flexer 140 generally rests upon, and bends to conform to, the arcuate body top surface 136.

Figure 9A:
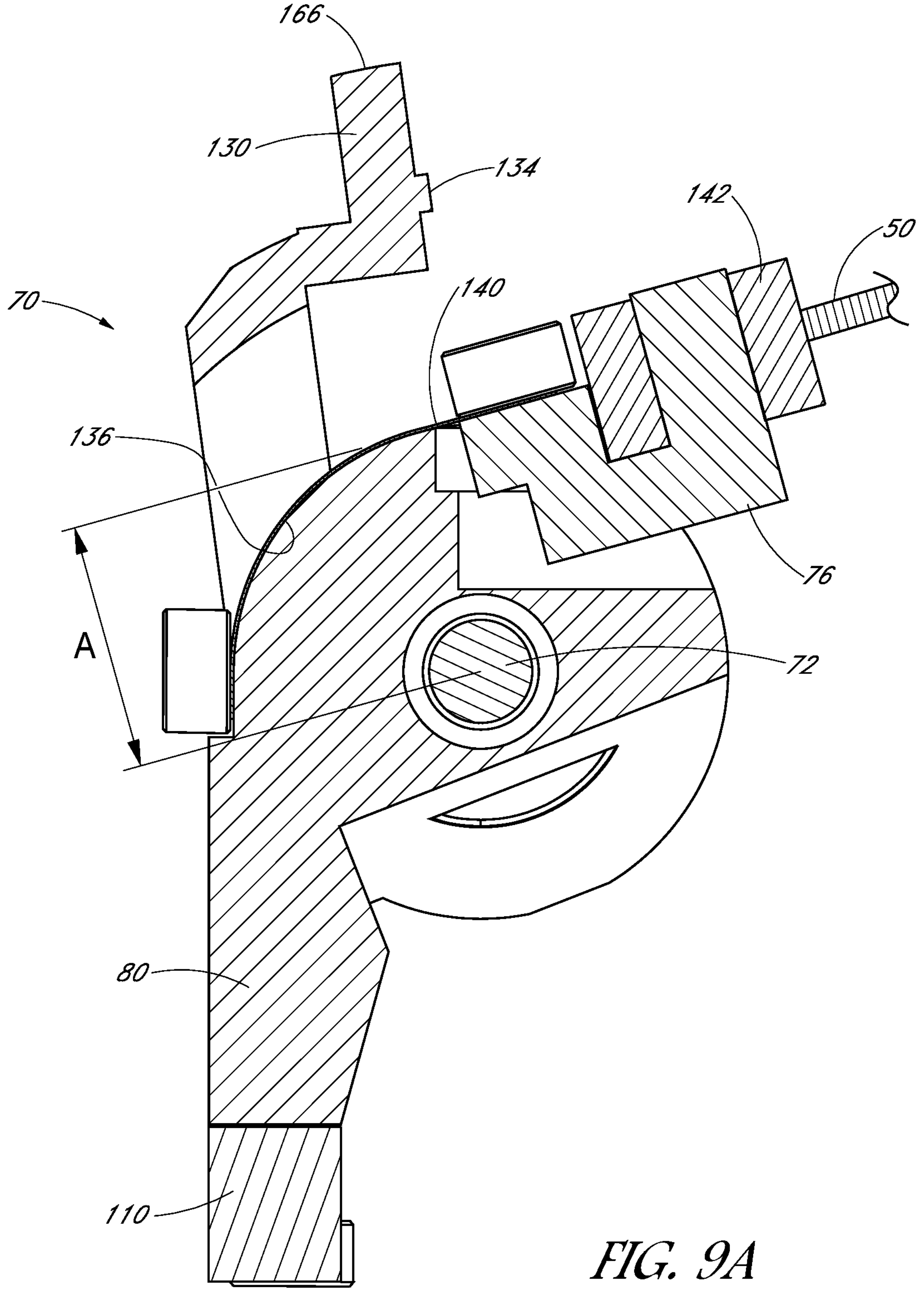
FIG. 9A is a cross-sectional view taken along line 9-9 of FIG. 8, but adding a musical string attached to a string holder.

With particular reference to FIG. 9A, during use, a base 142 of a musical string 50 is attached to the string holder 76, and the string 50 is drawn to and over the associated saddle assembly 68, from which it extends into the playing zone 61 of the guitar. In the illustrated embodiment, tension in the string 50 will tend to pull on the string holder 76, which in turn will pull on the holder flexer 140 so that the holder flexer 140 bends over, and conforms to the shape of, the arcuate body top surface 136. Preferably the musical string 50 is generally axially aligned with the end of the holder flexer 140 that is attached to the string holder 76. As such, tension in the string 50 will deflect the holder flexer 140 and align the end of the holder flexer 140 that is attached to the string holder coaxially with the string 50 so that the string 50 and holder flexer 140 extend in a direction tangential to the arcuate body top surface.

Figure 9B:
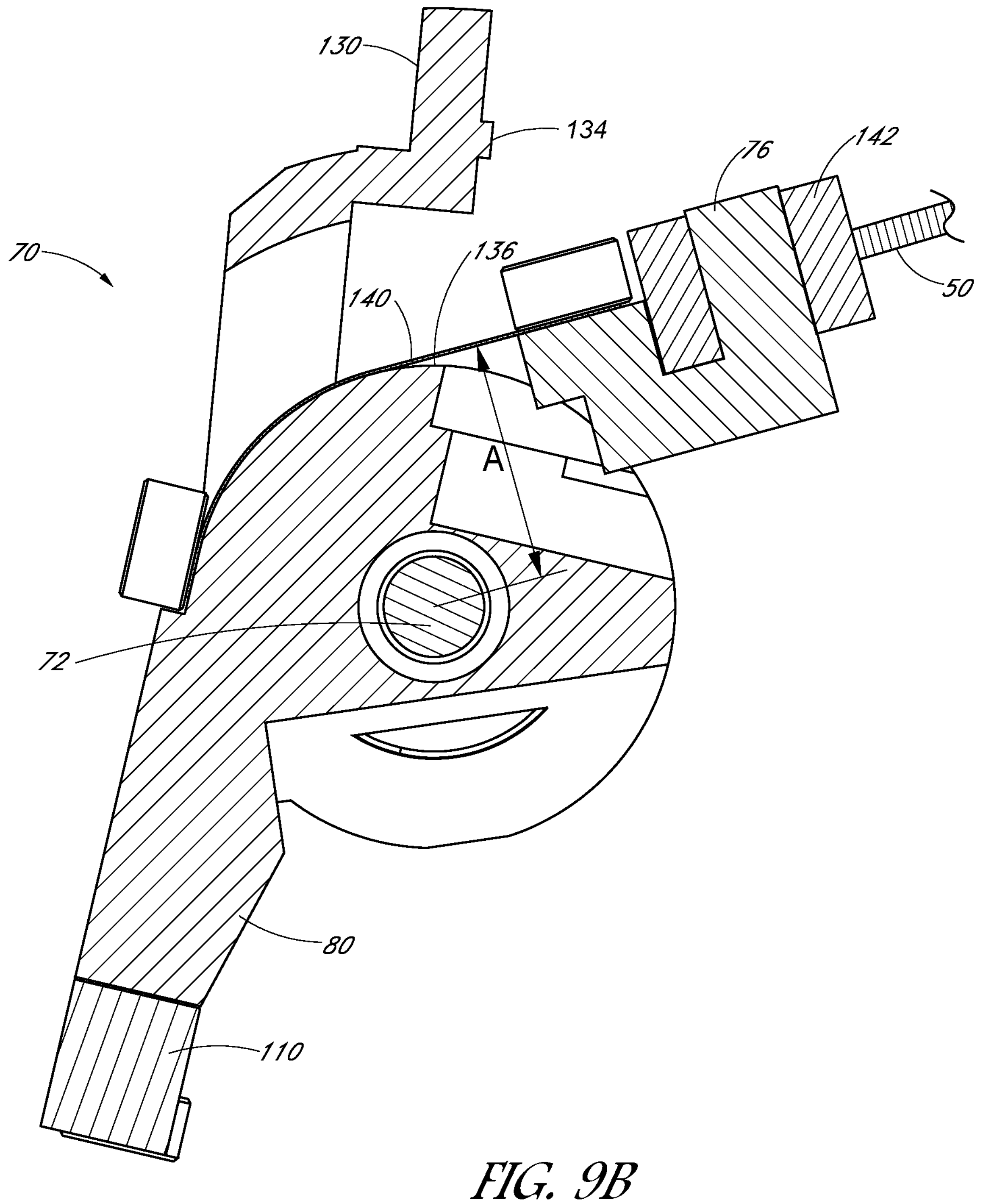
FIG. 9B shows the arrangement of FIG. 9A at a second position.

FIG. 9A depicts the force modulation member 70 at a first position similar to that depicted in FIG. 6. When, due to changes in string length, the force modulation member 70 rotates to a second position as shown in FIG. 9B, the holder flexer 140 partially unwinds from the arcuate surface 136. However, preferably, the angle at which the holder flexer 140 departs the arcuate surface 136 remains substantially the same, and the corresponding angle of the musical string 50 also remains constant, approaching the associated saddle assembly 68 at the same angle without regard to the rotational position of the force modulation member 70. As such, notwithstanding rotation of the force modulation member 70 with varying string length, the lever arm A upon which the string 50 acts upon the force modulation member 70 remains the same at the first and second positions, and at all positions within the operating range of the force modulation member 70. Also, frictional losses that could be expected from out-of-axis bending of the musical string 50 during such rotation of the force modulation member 70 are reduced or eliminated by the holder flexer 140, which preferentially bends out-of-axis relative to the string 50.

With reference again to FIGS. 2 and 3, a frame cover 146 is attached to or coformed with the frame 64. In the illustrated embodiment the frame cover 146 generally encloses the force modulation member 70 and includes a space opening toward the saddle assemblies 68 for the musical string 50 to access the string holder 76. The illustrated frame cover 146 also includes a plurality of spaced-apart view slots 150 through which the stop body 130 of respective modulation member 70*s* extend. As such, a user can detect rotation of the modulation member 70 by viewing movement of the stop body 130 within the view slots 150. In a preferred embodiment, a user tunes the instrument by adjusting the position of the shuttle 94 so that the string is in tune while the stop body 130 is within the view slot 150 and between the front and back surfaces of the view slot 150. Preferably, the length of the view slot 150 between front and back surfaces 152, 154 corresponds to an operational range of the force modulation member 70 in which the frequency of the corresponding musical string 50 will not change sufficient to be aurally detectable. Thus, once correct tuning has been established, as long as the stop body 130 is maintained between the front and back surfaces 152, 154 of the view slot 150 (and not in actual contact with either of such surfaces 152, 154), the tension applied to the string 50 will be such that the string will be in tune.

Figure 10:
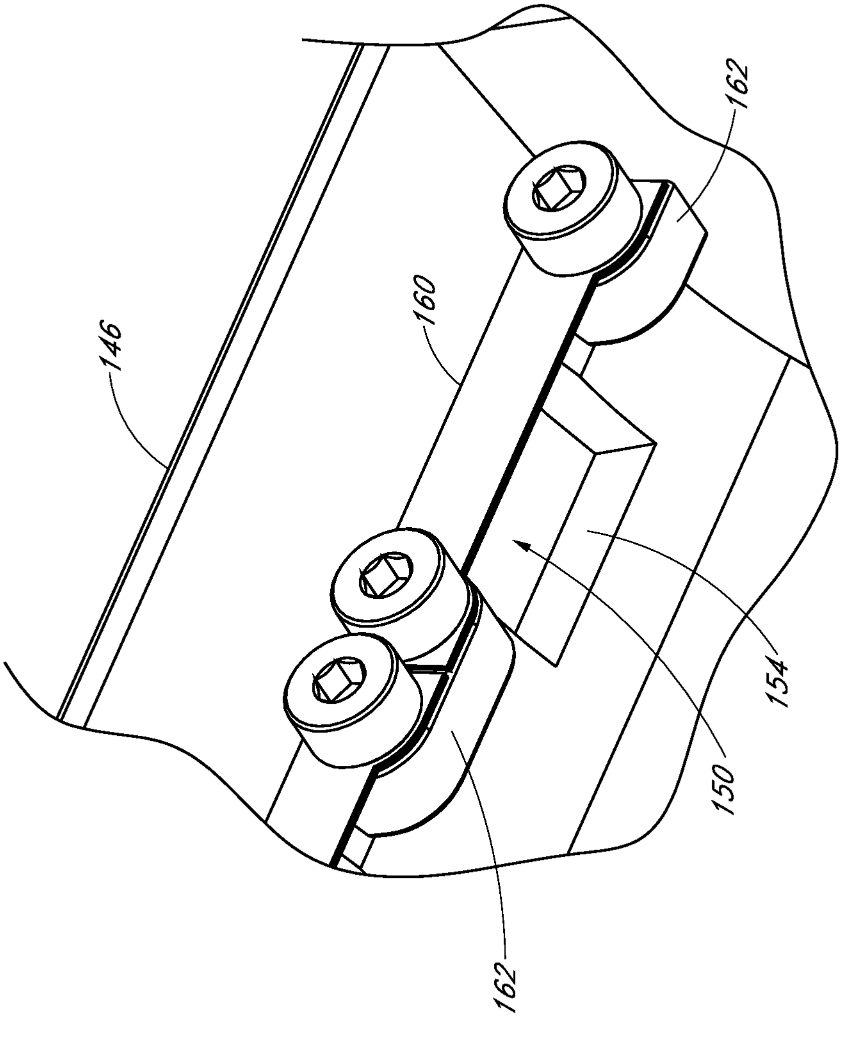
FIG. 10 is a cutaway view taken along line 10-10 of FIG. 2, but shown at a perspective view.
Figure 11:
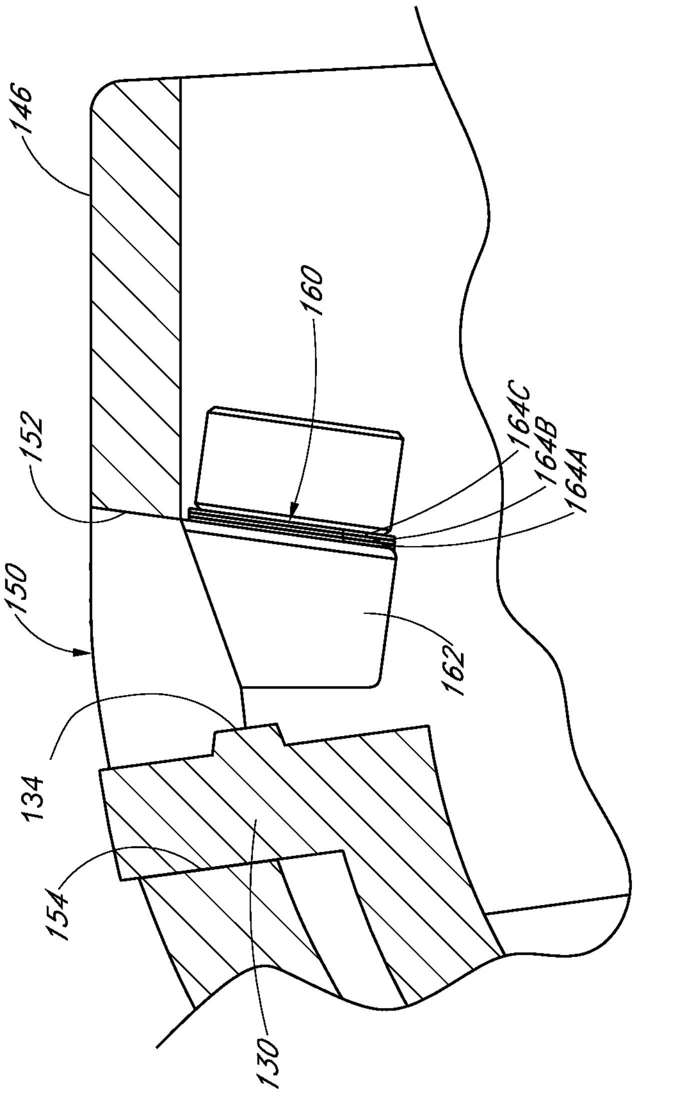
FIG. 11 is a cross-sectional view taken along line 11-11 of FIG. 2.
Figure 12:
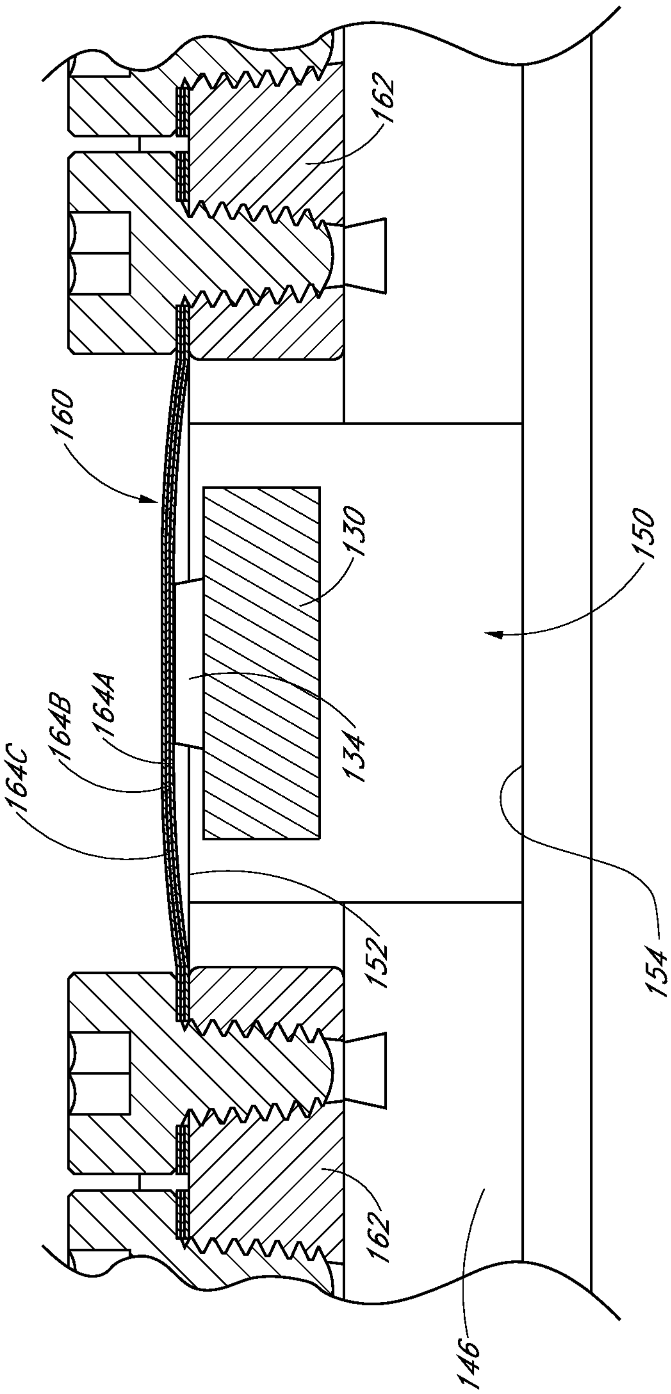
FIG. 12 is a cross-sectional view taken along line 12-12 of FIG. 3, but shown with the stop body of the force modulation member rotated forwardly within the view slot.

With additional reference to FIGS. 10-12, a plurality of flexible stops 160 are attached to the frame cover 146 so that one flexible stop 160 is positioned adjacent to the front surface of each view slot 150. Each flexible stop 160 comprises mount apertures at opposing ends. The frame cover 146 comprises a plurality of corresponding mount bosses 162. The flexible stops 160 are attached via fasteners that extend through the mount apertures into the mount bosses 162. As such, each flexible stop 160 extends across the path of the stop body 130 so that the bumper 134 of the stop body 130 will engage the flexible stop 160 generally at its center. In the illustrated embodiment the flexible stop 160 is generally aligned with the front surface 152 of the view slot 150. It is to be understood, however, that in additional embodiments the flexible stop 160 can be located somewhat forwardly or backwardly of the front surface 152.

In the illustrated embodiment, each flexible stop 160 comprises three stop plates (164A, 164B, 164C). The illustrated stop plates 164 are formed of spring steel having a thickness between about 0.002-0.004 inch. In this configuration, the flexible stop 160 can deform significantly when the bumper 134 moves forwardly sufficient to contact the flexible stop 160. For example, when a guitarist "bends" a musical string 50 during play, the string 50 is pulled, rotating the force modulation member 70 so that the stop body 130 of the modulation member 70 moves forwardly within the view slot 150. The bumper 134 is urged against the flexible stop 160 with sufficient force so that the flexible stop 160 deflects, as depicted in FIG. 12. Notwithstanding such deflection, the flexible stop 160 prevents further rotation of the modulation member 70, thus enabling the musical string 50 to change tune when being "bent" by the user. However, because of the flexing/deforming of the flexible stop 160, the bumper 134 and flexible stop 160 remain engaged tightly with one another even during minor movements of the stop body 130 that may occur if the bending force applied to the corresponding musical string 50 varies slightly and in spite of variations in string tension that may occur due to vibrations in the string 50. This provides a good engagement between the bumper 134 and flexible stop 160, lessening the likelihood of buzzing, which may occur if contact between the bumper 134 and stop is weak or intermittent.

It is to be understood that various materials and structure may be used for the flexible stop 160 in order to achieve the design goal of the flexible stop 160 being relatively flexible. For example, a soft, readily deformable metal can be used for the entire stop, or for one or more of the stop plates, and/or a plastic layer may be included. Further, in some embodiments an elastomeric layer may be disposed on the contact plate and/or between one or more of the stop plates 164.

In a preferred embodiment, the flexible stop 160 is configured to flex only a limited range, such as less than 3 mm, and more preferably less than 1 mm, upon application of bending force to the corresponding string 50 by the musician. In some embodiments the flexible stop 160 is selected to achieve this limited flexing range upon application of a maximum force to the string that is between about 35-50%, and more preferably about 40%, of the base tension of the musical string. Thus, in some embodiments, the flexible stops for individual strings may be configured differently than one another.

With reference again to FIGS. 1-3, the stop body 130 of each spring force modulation member 70 is visible within the view slot 150. Preferably, an indicator portion 166 of the stop body 130 extends through the view slot 150 and past the frame cover 146. When the illustrated instrument is tuned as discussed above, the stop body 130/indicator portion will be disposed within the view slot 150 but spaced (even slightly) from both the front surface 152 and back surface 154 of the view slot 150. In one preferred embodiment, the musician preferably tunes the instrument so that the indicator portion 166 is positioned generally centrally between the front and back surfaces 152, 154 of the view slot 150 when the string 50 is at a perfect tune tension. In another embodiment, a musician that wishes to bend notes may tune the instrument so that the indicator portion 166 is positioned close to the front surface 152 of the view slot 150. As such, when deforming the string so as to "bend" notes, the stop body 130 will readily be pulled against the front surface 152 of the view slot 150 (and/or flexible stop 160), preventing rotation of the force modulation member 70, and the user's deformation of the musical strings will change the tone of the string 50. When the string is released, the stop body 130 will again be drawn away from the front surface 152, and the constant tension features will again be operational.

As the associated musical string 50 stretches or contracts, the spring force modulation member 70 will rotate so as to maintain tension in the musical string 50 within a desired range of perfect tune. The position of the stop body 130 within the view slot 150 will change during such rotation. Preferably, the assembly is configured—and the length of the view slot 150 is selected—so that there is substantially no audible change in the tune of the musical string 50 when the stop body 130 moves within the view slot 150 between the front and back surfaces 152, 154. Additional embodiments can be configured so that there is substantially no audible change in musical string 50 tune as long as the stop body 130 moves less than ⅔, or ½ in other embodiments, of the distance between the front and back surfaces of the view slot 150.

If a musical string breaks or is removed, the tension applied by the spring 90 will be unopposed by any string, resulting in rotation of the modulation member 70. However, in the illustrated embodiment, such rotation will be stopped when the stop body 130 engages the back surface 154 of the view slot 150. As such, the string holder 76 is kept in an easily-accessible position for loading a replacement string. Also, potential damage to the coil spring 90 and/or associated flexers that may occur in the event of sudden, unrestricted rotation of the modulation member 70, is avoided. Further, the associated spring 90 is maintained in the position corresponding to correct tuning of the associated musical string 50. Thus, upon loading of a replacement string, and tightening of such string using the tuning knobs 48, once such string 50 is tightened sufficient that the stop body 130 is pulled off the back surface 154 to a position between the front and back surfaces 152, 154 of the view slot 150, the string 50 will be at or near perfect tune, requiring little, if any, further adjustment of the shuttle 94 to bring the string into perfect tune.

As discussed above, a base 142 of a musical string 50 is connected to the spring force modulation member 70 and extends to and over an associated saddle assembly 68, from which the string extends into a playing zone 61. FIGS. 2 and 3 depict two embodiments of saddle assemblies 68 in place on the frame 64, although the illustrated frame 64 is configured for a four-string guitar. It is to be understood that various types and configurations of saddle assemblies can be employed. However, in the illustrated embodiment, the saddle assemblies 68 are configured so that they can be adjusted to increase or decrease in height in order to provide a desired string action. The illustrated saddle assemblies 68 can also be moved longitudinally so as to individually adjust the playing length of the corresponding string in order to optimize intonation for the corresponding string 50. The illustrated saddle assemblies 68 further are configured to rotate slightly so as to accommodate lengthening and contraction of the corresponding musical string 50 without requiring the string to slide substantially over the saddle assembly. Still further, it is contemplated to employ saddle assemblies of different sizes in order to accommodate a user's desired range of string height adjustments as well as string sizes and types. The illustrated embodiment exemplarily displays a large saddle assembly and a small saddle assembly.

Figure 17:
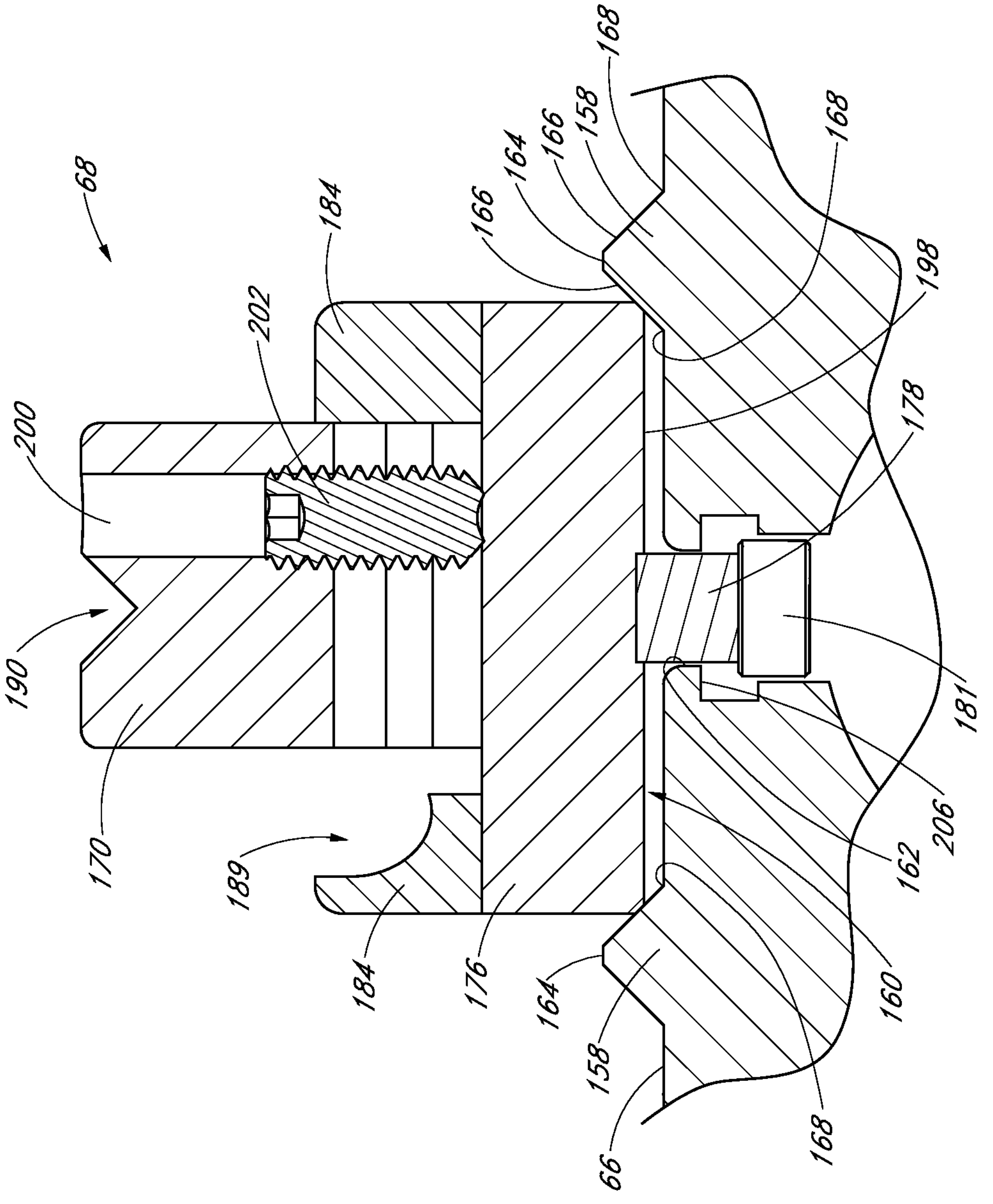
FIG. 17 is a cross-sectional view taken along line 17-17 of FIG. 2.

With continued reference to FIGS. 2 and 3, and additional reference to FIG. 17, the frame 64 includes a generally flat frame surface 66 on which is defined a plurality of raised elongated saddle track members 158 that are spaced apart from and parallel to one another. Saddle paths 160 are defined between adjacent saddle track members 158, and each saddle assembly 68 is configured to be movable longitudinally within its corresponding saddle path 160. An elongated saddle guide slot 162 is disposed centrally within each saddle path 160 so as to help guide movement of the saddle assembly 68 within the saddle path 160 in a manner as will be discussed in more detail below. In the illustrated embodiment, each saddle track member 158 is integrally formed with the frame 64 and extends upwardly from the frame surface 66. The illustrated saddle track members 158 are generally triangular in cross-section, having a track tip 164 from which opposing track sides 166 depend at 45° angles, intersecting the frame surface 66 at track member bases 168. As such, a distance between adjacent track tips 164 is greater than a distance between adjacent track member bases 168.

With particular reference to FIGS. 13-17, the illustrated large saddle assembly 68 comprises a saddle upper body 170 configured to be movably supported by a saddle base 172. A pivot receiver 174 of the saddle base 172 is configured to receive an elongated saddle pivot 176. An elongated saddle guide 178 attaches to the saddle base 172 so that the saddle pivot 176 is sandwiched between the saddle base 172 and the saddle guide 178.

The saddle upper body 170 is configured to be received into a base cavity 180 that is formed by bottom and side walls 183, 184 of the saddle base 172. Elongated vertical guide slots 182 are formed in side walls 184 of the saddle base 172 and are configured to receive complementarily-formed keys 186 protruding from the saddle upper body 170. In this manner, the saddle upper body 170 can be moved vertically within the base cavity 180 while the engaged keys 186 and guide slots 182 help protect against twisting or other non-vertical movement of the upper body 170 relative to the base 172.

Figure 13:
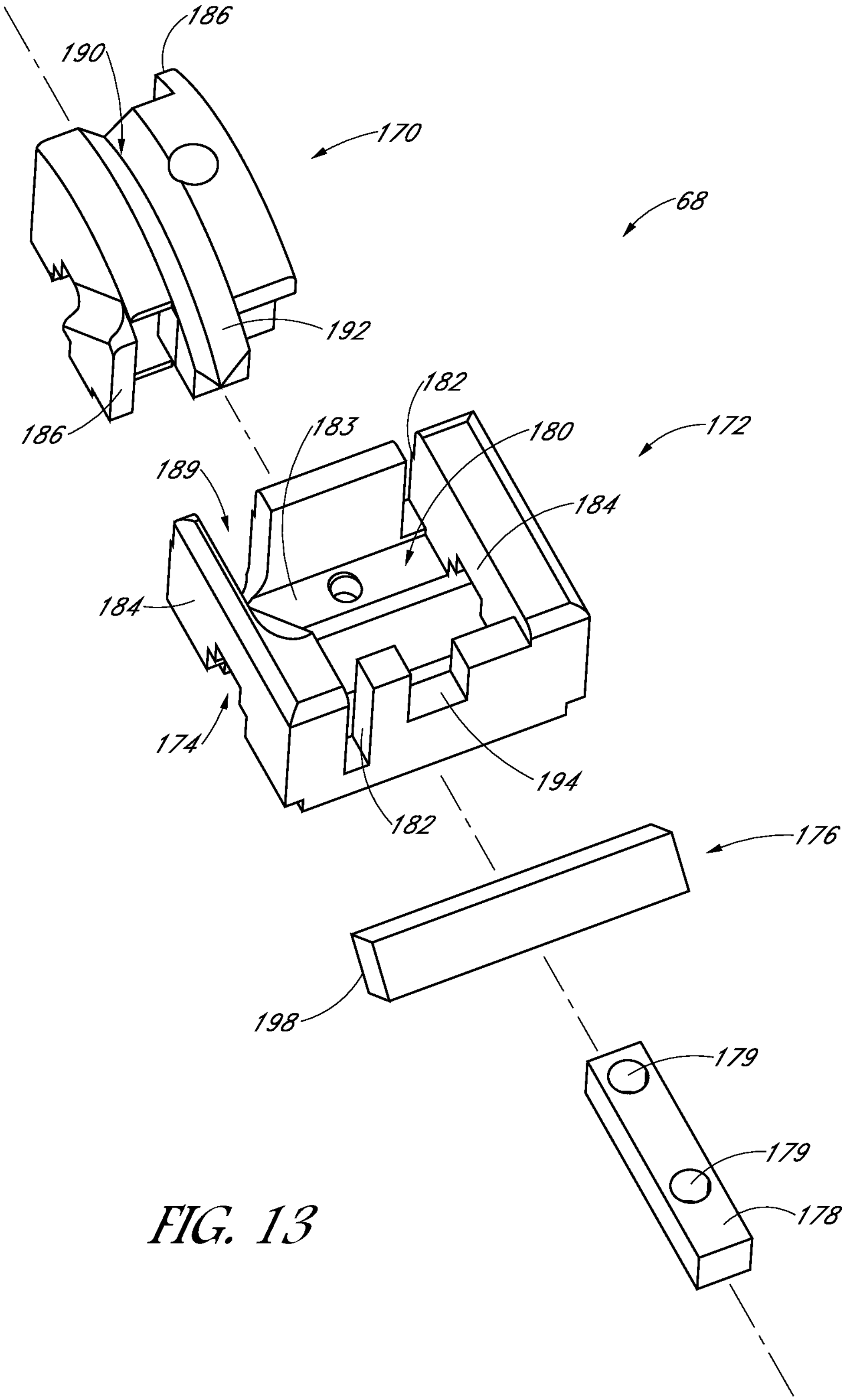
FIG. 13 is a perspective exploded view of a saddle assembly configured in accordance with an embodiment.
Figure 14:
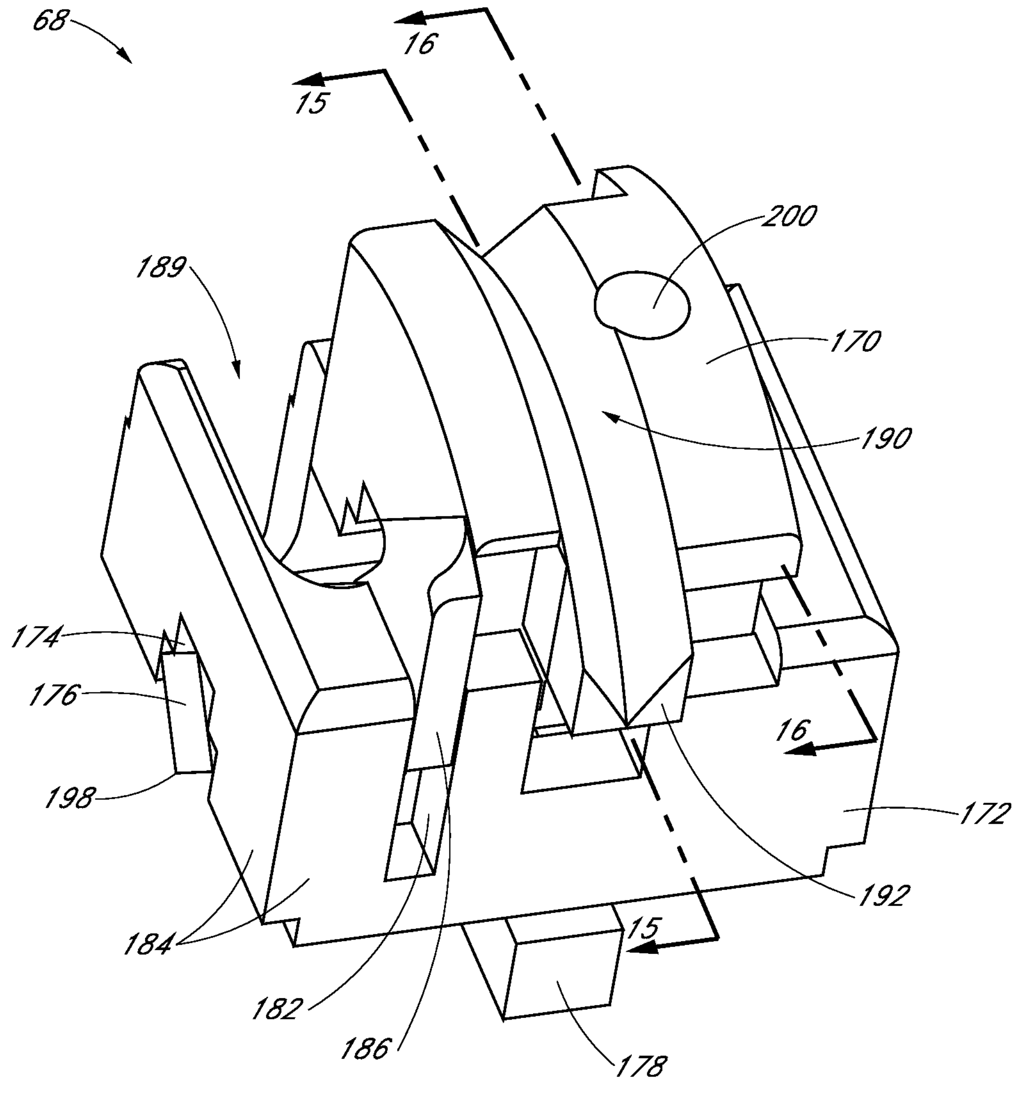
FIG. 14 is a perspective view of the saddle assembly of FIG. 13 assembled.

In the illustrated embodiment, the saddle upper body 170 and saddle base 172 are configured so that, when assembled as depicted in FIGS. 2, 13 and 14, an angled access path 189 is defined. The access path 189 is configured so that when the saddle assembly 68 is positioned forwardly within the saddle path 160, as depicted in FIG. 2, an adjustment tool can be advanced through the access path 189 and into the adjustment bolt access hole 99 formed in the frame 64 to enable a user to adjust the adjustment bolt 98

An elongated and arcuate string receiver 190 is defined along the top surface of the saddle upper body 170. The illustrated string receiver 190 is V-shaped in cross-section, and thus receives a musical string 50 in a manner so that the string is prevented from moving laterally (i.e., side-to-side), preventing vibration that could cause a buzzing sound. In the illustrated embodiment, a string receiver extension 192 extends from the saddle upper body 170 on a side of the saddle assembly facing the string holder 76. A receiver slot 194 formed in the saddle base 172 is sized to complementarily receive the string receiver extension 192 when the saddle upper body 170 is lowered into the base cavity 180. Preferably, the string receiver 190 has an arc selected to optimally redirect the musical string 50 as it extends from the string holder 76 onto and over the saddle assembly 68 and into the playing zone 61. It is to be understood that, in some embodiments, the string receiver 190 is configured so the musical string 50, as it is being redirected, may or may not engage the entire length of the elongated string receiver 190.

With continued specific reference to FIGS. 13-17, the illustrated saddle pivot 176 is an elongated bar having a square cross-section. The saddle pivot 176 is received within the pivot receiver 174 of the saddle base 172, and surfaces within the pivot receiver 174 are configured to engage the saddle pivot 176 so as to hold it in a position so that its side surfaces are at a 45° angle relative to the bottom wall 183 of the saddle base 172. A saddle pivot tip 198 is defined along the lowermost edge between saddle side surfaces. Preferably, the saddle pivot tip 198 extends a very short distance below the base bottom wall 183.

The illustrated saddle guide 178 is also elongated, having a rectangular cross-section configured to complementarily fit through, yet be slidable within, the saddle guide slot 162 of the frame 64. A pair of spaced apart fastener holes 179 are formed through the saddle guide 178 and are configured to align with a corresponding pair of fastener holes that are formed through the saddle base bottom wall 183 and on opposite sides of the pivot receiver 174. As such, when fasteners 181 are extended through the aligned fastener holes 179, the saddle pivot 176 is sandwiched between the saddle guide 178 and the saddle base 172.

In a preferred embodiment, the saddle pivot 176 is formed of a material that is harder than the frame surface 66, and also harder than the saddle guide 178. For example, in a preferred embodiment, the frame 64 is formed of an aluminum, as is the saddle guide 178, saddle base 172 and saddle upper body 170, but the saddle pivot 176 is formed of a high-strength steel. As such, when the saddle guide 178 is fastened to the saddle base 172 with the saddle pivot 176 sandwiched therebetween, the saddle pivot tip 198 will slightly penetrate the surface of the saddle guide 178, further securing its position between the saddle guide 178 and saddle base 172.

Figure 16:
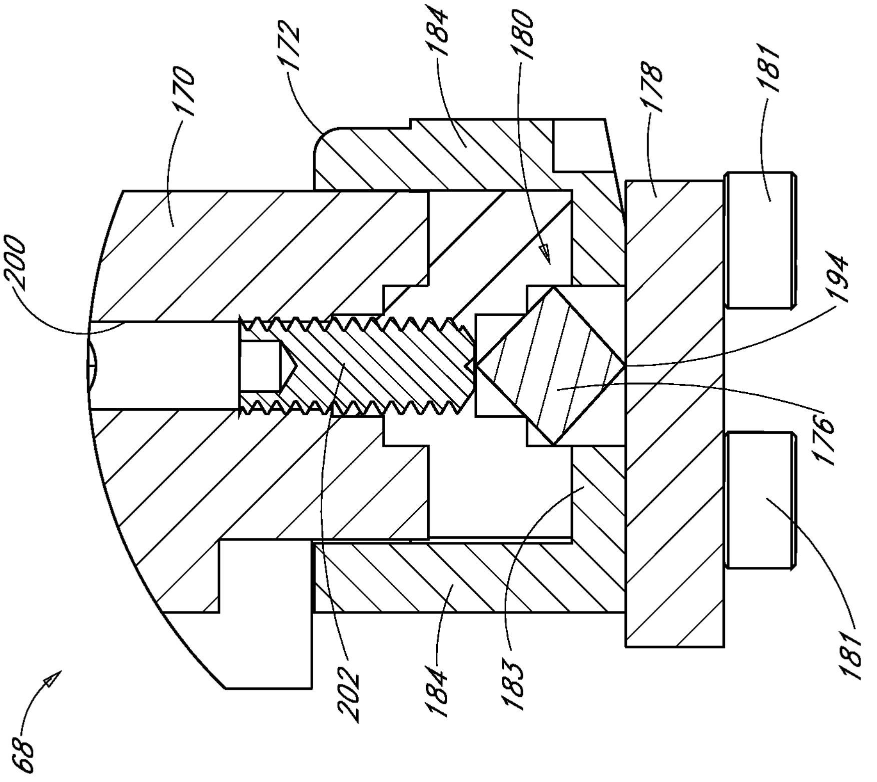
FIG. 16 is a cross-sectional view taken along line 16-16 of FIG. 15.
Figure 15:
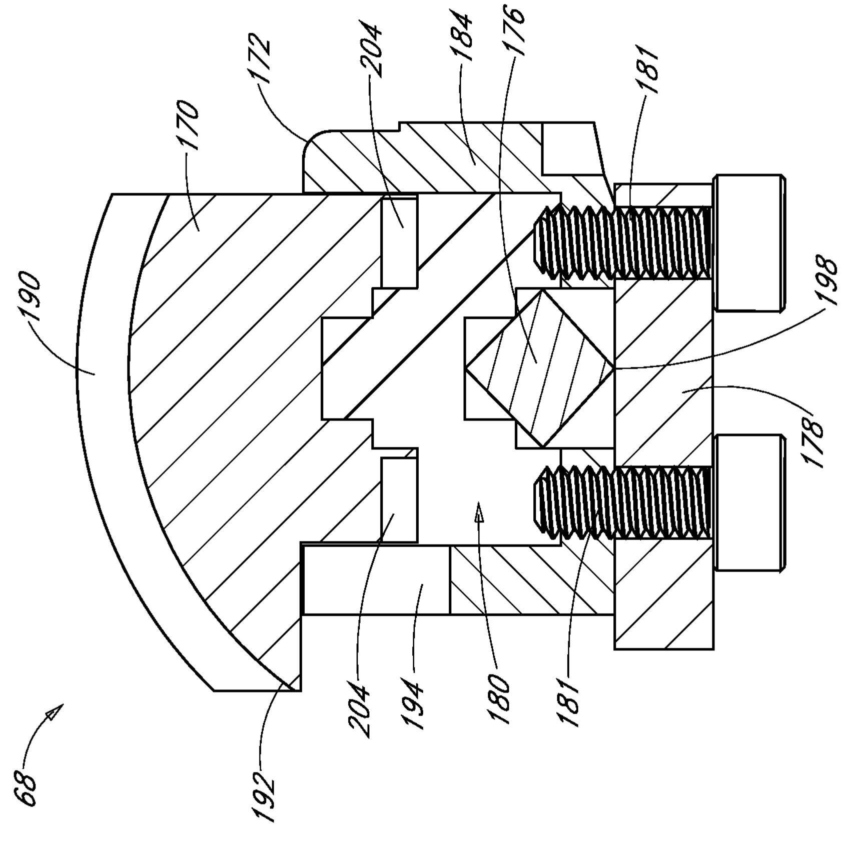
FIG. 15 is a cross-sectional view taken along line 15-15 of FIG. 14.

With continued reference to FIGS. 2 and 13-17, and with particular reference to FIGS. 15 and 16, an adjustment hole 200 is defined in the saddle upper body 170 and is configured to support a threaded height adjustment screw 202 therewithin. The height adjustment screw 202 is positioned and configured to engage an upper edge of the saddle pivot 176. By advancing an adjustment tool into the adjustment hole 200 and into engagement with the height adjustment screw 202, a user can threadingly advanced or retract the height adjustment screw 202 so as to raise or lower the position of the saddle upper body 170 relative to the saddle base 172, thus defining a desired string height. Fastener spaces 204 may be provided in the saddle upper body 170, and are aligned with and configured to receive tips of the fasteners 181 when the upper body 170 is at its lowest position. Preferably, the fastener receivers 204 do not engage the fasteners 181, but merely define a space 204 into which the tips of the fasteners 181 extend without interfering with the saddle upper body 172.

In the illustrated embodiment, the saddle assembly 68 can be slid along the saddle path 160 to a desired position corresponding to optimized string intonation. When the corresponding musical string 50 is tightened so that it is at a desired tune, the force of the string applied to the saddle assembly 68 will urge the saddle pivot tip 198 to slightly penetrate the track sides 158, thus helping prevent the saddle assembly 68 from undesired longitudinal movement along the saddle path 160.

With particular reference to FIG. 17, preferably the saddle assembly 68 is placed within the saddle path 160 so that its saddle guide 178 extends through the saddle guide slot 162 and the saddle pivot tip 198 rests upon track sides 166 of opposing saddle track members 158. As such, the saddle pivot tip 198 (and saddle base bottom wall) is spaced from the frame surface 66 and supported by opposing saddle track members 158. Thus, the saddle assembly 68 can pivot about the saddle pivot tip 198 over a selected angular range without the saddle base bottom wall 183 engaging the frame 64.

In the illustrated embodiment, the fastener 181 heads are wider than the saddle guide slot 162. Thus, if the frame 64 is upended, the blocking surface 206 engages edges of the fastener heads, which will not fit through the saddle guide slot 162, and thus the saddle base 172 will not unintentionally fall out of the saddle guide slot 162.

With the saddle assembly 68 in place and supporting a tuned musical string 50, the saddle assembly 68 is configured to accommodate and enable the beneficial operation of the spring force modulation member 70. More specifically, as a musical string stretches or contracts, the spring force modulation member 70 is configured to rotate so that a constant or near-constant tension is maintained in the corresponding musical string 50. Also, since the saddle assembly 68 is secured in place to prevent longitudinal movement, the longitudinal movement of the musical string 50 during expansion or contraction will not change the longitudinal position of the saddle assembly 68, thus maintaining the correct intonation position. Further, and with additional reference to FIG. 3, to prevent or alleviate the musical string 50 from sliding over the surface of the string receiver 190 (which would create friction forces resisting string movement), the saddle assembly 68 can pivot about the saddle pivot tip 198. As such, this configuration accommodates substantially unrestrained lengthening and contraction of musical strings (over a defined operational range) while maintaining such strings at their desired tuning tensions.

In the illustrated embodiment, the upper body 170 is not restrained within the base. 172 Rather the downwardly-directed force of the musical string 50 keeps the upper body 170 engaged within the base cavity 180. In additional embodiments, structure can be provided to prevent or inhibit the saddle body 170 from being fully removed from the base cavity 180. Such structure can include, for example, a horizontally-directed screw supported in one of the sidewalls 184 of the base 172 and arranged either to prevent vertical movement of the upper body 170 altogether or to define a top limit for vertical movement of the upper body relative to the base. Other structure can comprise a high-friction member, such as a textile layer or a spring-biased member, arranged between one or more of the base side walls 184 and the saddle upper body 170.

Figure 18:
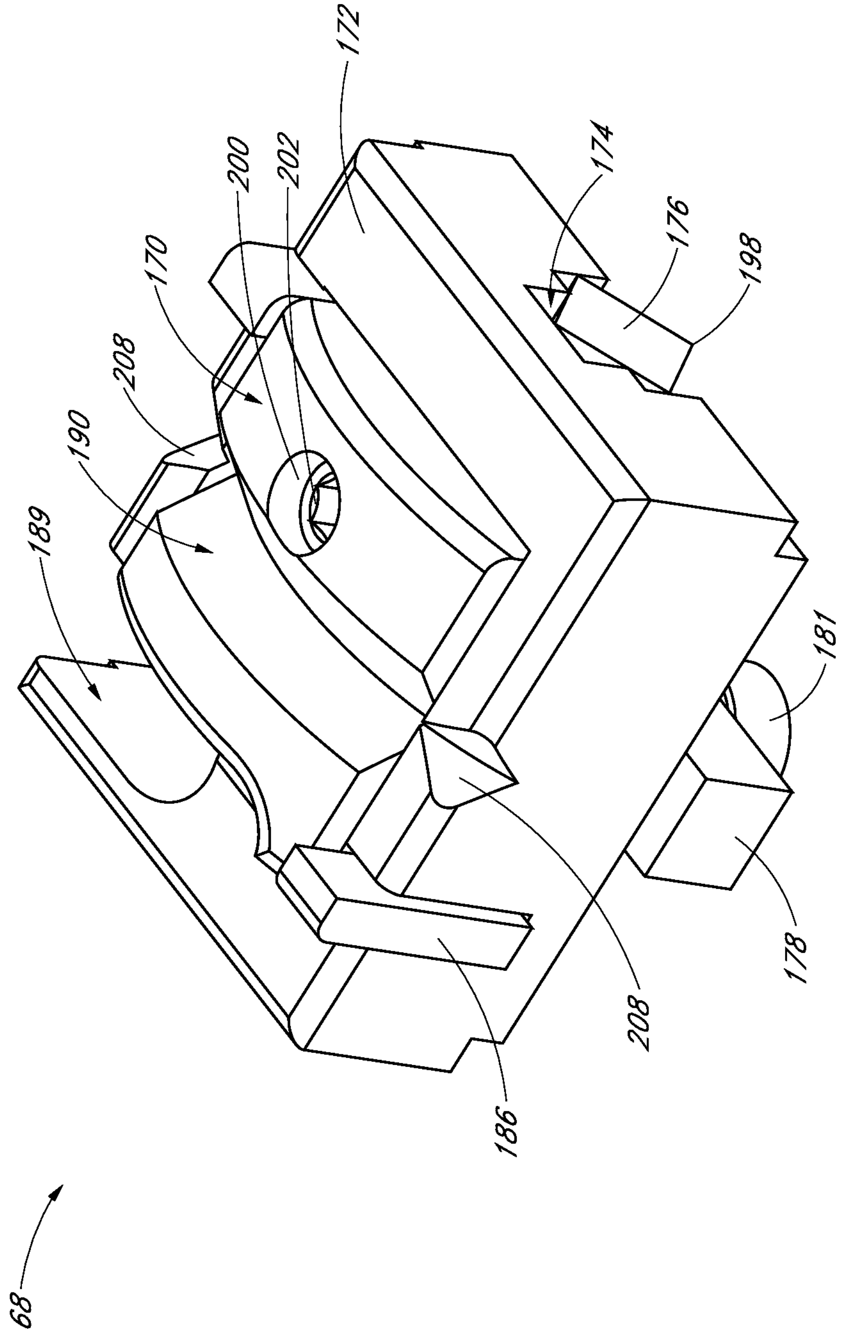
FIG. 18 is a perspective view of a saddle assembly in accordance with another embodiment.

With reference next to FIG. 18, an embodiment of a small saddle assembly 68 preferably incorporates principles and structure having similarities with the large saddle assembly discussed in detail above. However is to be understood that the particulars of such embodiments may be different, including accommodations for the smaller size. For example, in the illustrated small saddle assembly 68, the saddle upper body string receiver 190 does not include a string receiver extension. Rather, the saddle base includes a pair of base string receiver portions 208 configured to align with the string receiver 190 when the upper body 170 is at its lowest position relative to the base 172.

Figure 19:
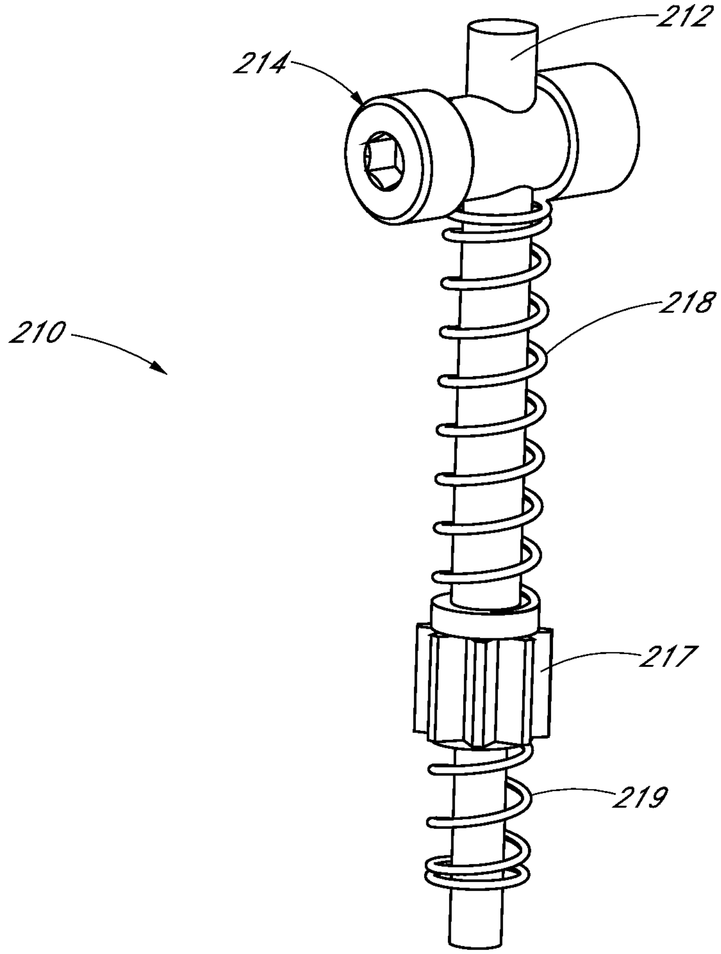
FIG. 19 is a perspective view of an intonation marker in accordance with an embodiment.

With reference again to FIG. 2 and additional reference to FIG. 19, in the illustrated embodiment, an intonation marker can be employed to mark the proper longitudinal placement of a saddle assembly so that if the string 50 is removed, and the saddle assembly 68 becomes free to move on its own, a user can know the proper location for the saddle assembly when the instrument is restrung. It is to be understood that various structures and methods can be employed for marking the proper intonation position. For example, in one embodiment, a user may simply place a sticker on the frame surface 66 at the proper intonation position.

In the illustrated embodiment, an intonation marker assembly 210 comprises an elongated threaded rod 212 upon which a marker 214 is placed in a manner so that when the rod 212 is rotated, the marker 214 is advanced or retracted along the length of the rod 212. Preferably, an intonation marker slot 216 is formed through the frame 64 within each saddle path 160, and the intonation marker assembly 210 is placed within the marker slot 216. The illustrated intonation marker assembly 210 includes a knob 217 configured to rotate the threaded rod 212. A first spring 218 extends between the knob 217 and the marker 214, and a second spring 219 extends from the knob 217 to the frame 64. In use, a user turns the knob 217 until the marker 214 just touches the back side of the associated saddle assembly 68, preferably when the saddle assembly is rotated counter-clockwise (i.e., when the stop body 130 is resting against the back surface 154 of the view slot 150—at the extreme range of rotation of the saddle assembly 68). The marker 214 is left in that position.

In the illustrated embodiment, the saddle assembly 68 can move longitudinally without restraint while the string 50 is removed or loose. Thus, placement of the saddle assembly 68 for proper intonation can be lost when the string is removed. In this embodiment, when restringing the instrument the user will move the saddle assembly 68 so that it just touches the marker 214 when the saddle assembly is rotated counter-clockwise to the end of its range (while the stop body 130 is resting against the back surface of the view slot 150). The musical string 50 is then placed upon the saddle assembly 68 and tightened and appropriately tuned. During tuning, it is anticipated that the saddle assembly 68 will rotate clockwise and away from the marker 214 (as the stop body 130 is moved away from the back surface 154 of the view slot 150) so that the saddle assembly 68 will not contact the marker 214 during play. Notably, during play of the instrument, it can be anticipated that there will be vibrations within the frame 64. The first and second springs 218, 219 help prevent the intonation assembly from buzzing due to such vibrations, and will also help prevent buzzing should the saddle assembly 68 contact the marker 214 during instrument play.

It is to be understood that various iterations and structural alternatives can be employed for the intonation marker assembly. For example, instead of or in addition to the rod being threaded, the marker can have a screw that is tightened onto the rod when the marker is appropriately placed in order to mark the position and retain the marker at the selected position. Additionally, in another embodiment the spring can be connected to the marker and threaded through the knob so as to be configured to be lengthened or contracted upon rotation of the knob.

Figure 20:
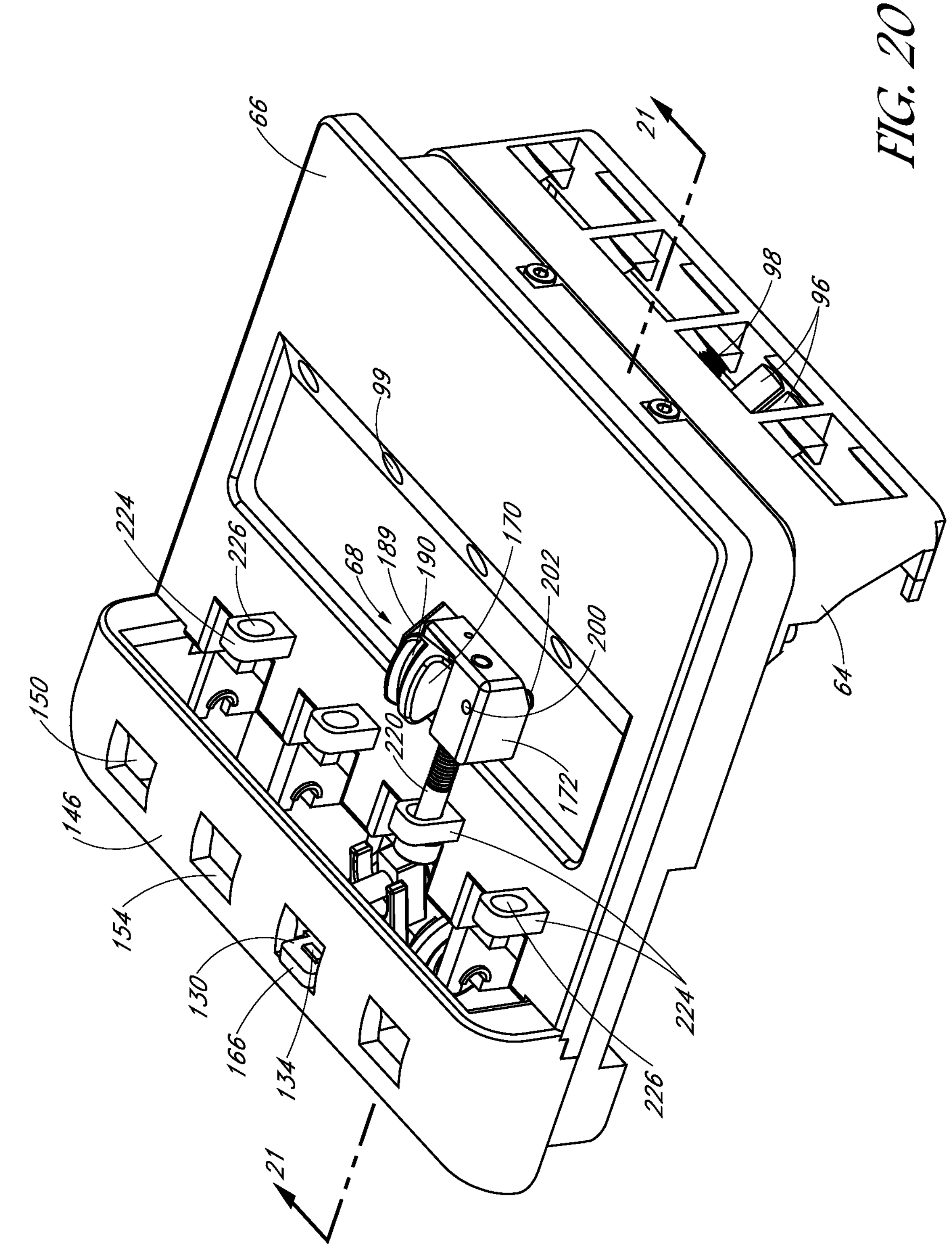
FIG. 20 is a perspective view of another embodiment of a string tensioner.
Figure 21:
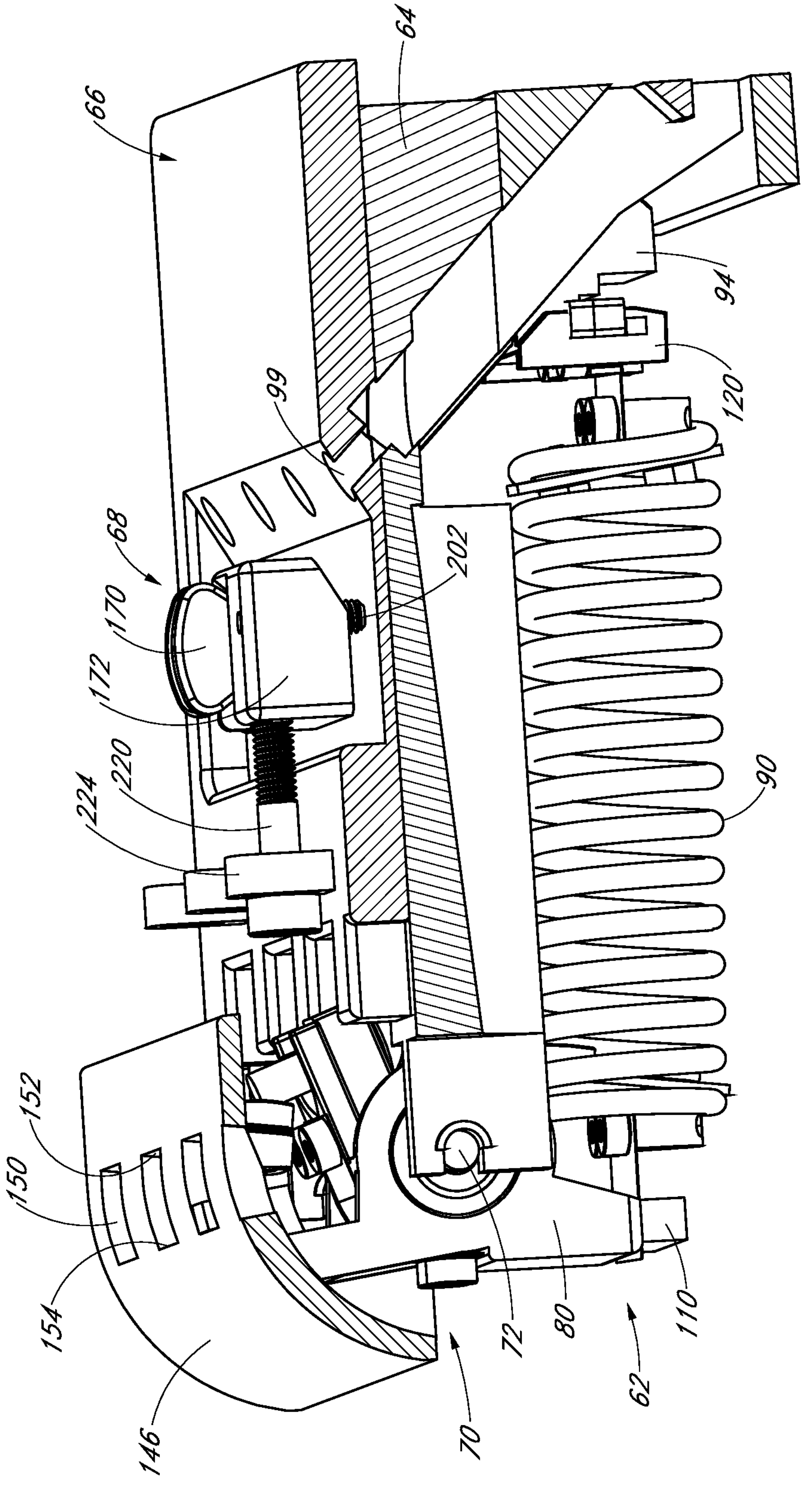
FIG. 21 is a cross-sectional view taken along line 21-21 of FIG. 20.
Figure 25:
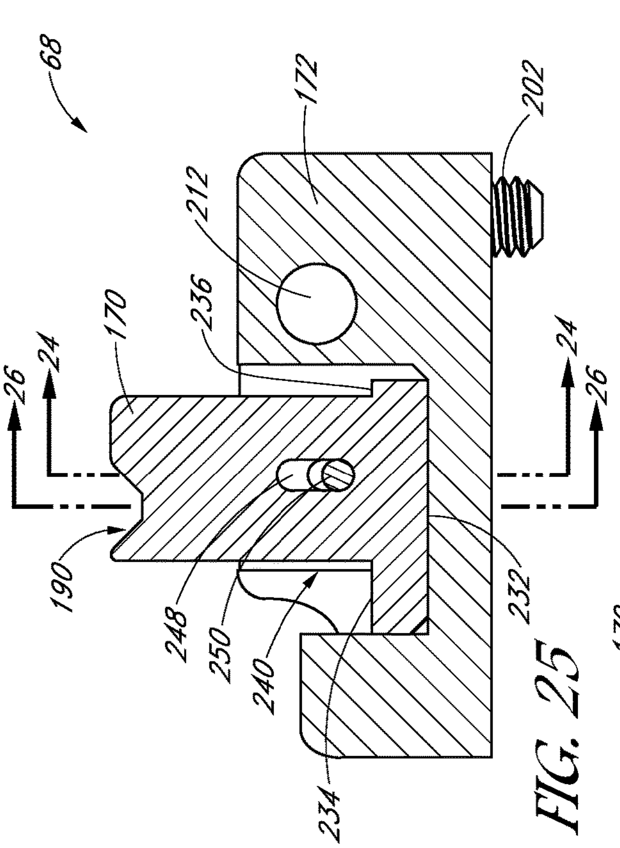
FIG. 25 is a cross-sectional view taken along line 25-25 of FIG. 22.
Figure 24:
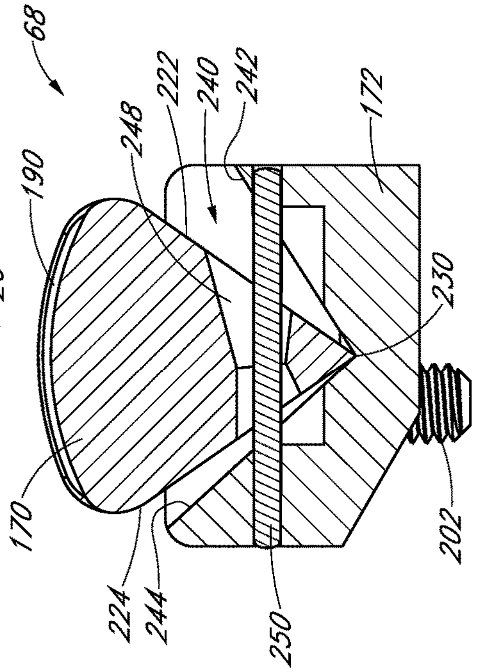
FIG. 24 is a cross-sectional view taken along line 24-24 of FIG. 25.

With reference next to FIGS. 20 and 21, another embodiment of a string tensioner 60 is presented. The illustrated string tensioner 60 is also configured to support four string holder assemblies 62, with each assembly configured to hold a single musical string 50, and to avoid clutter, only one of the string holder assemblies 62 is shown. The illustrated string tensioner 60 comprises a frame 64 configured to support the assemblies, and to be mounted in the body 32 of a musical instrument such as a guitar 30. The frame 64 includes a frame surface 66, which is configured to support four saddle assemblies 68.

With additional reference to FIGS. 22-25, the saddle assembly 68 comprises a base 172 having a horizontally-oriented longitudinal adjustment hole 222 configured to threadingly engage a longitudinal adjustment bolt 220. An intonation boss 224 extends upwardly from the frame surface 66 corresponding to each saddle assembly 68. The intonation boss 224 includes an aperture 226 through which the longitudinal adjustment bolt 220 extends. The aperture 226 is configured so that the head of the longitudinal adjustment bolt 220 will not fit therethrough. As such, rotation of the longitudinal adjustment bolt 220 adjusts the longitudinal position of the saddle assembly base 172 upon the frame surface 66.

A pair of height adjustment holes 200 are formed on opposing corners of the saddle assembly base 172. Each height adjustment hole 200 is configured to threadingly receive a height adjustment bolt 202. To adjust the height of the saddle assembly 68, and thus the string height, a user rotates the height adjustment bolts 202, which engage the frame surface 66, but are not threadingly engaged with the frame surface 66. In the illustrated embodiment, the aperture 226 of the intonation boss 224 is substantially oval so that the intonation bolt 220 can move vertically with the saddle assembly base 172 without changing its angular orientation. When no string is supported by the saddle assembly 68, the saddle assembly is prevented from falling off the frame 64 by the longitudinal adjustment bolt 220 and intonation boss 224.

Figure 22:
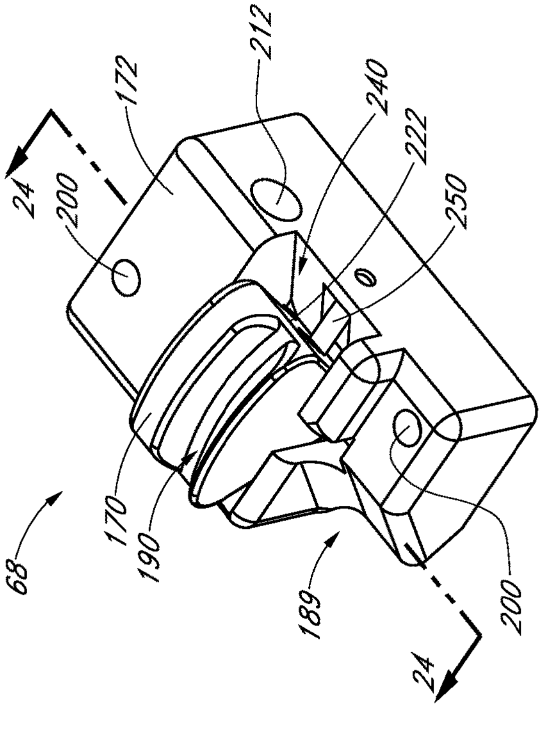
FIG. 22 is a perspective view of another embodiment of a saddle assembly.
Figure 23:
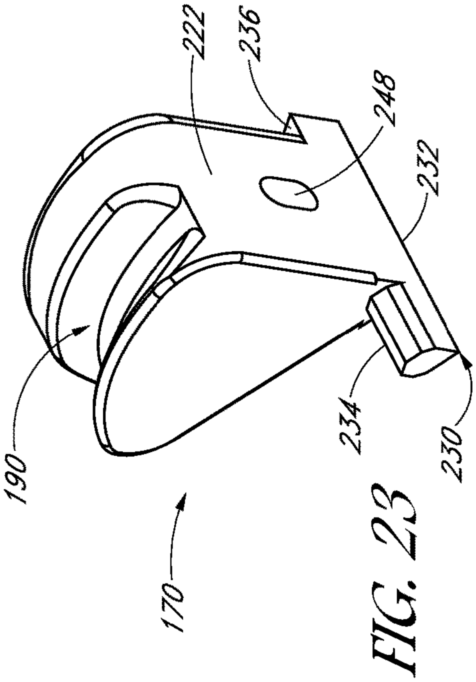
FIG. 23 is a perspective view of a saddle body configured for use in the saddle assembly of FIG. 22.

With continued reference to FIG. 22, the saddle assembly base 172 includes an inclined portion configured to provide an access path 189 for a tool to access the shuttle adjustment bolt access hole 99 formed through the frame surface 66 when the saddle assembly 68 is in a forward position.

With reference again to FIGS. 22-25, the saddle assembly base 172 pivotably supports a saddle body 170 having a string receiver 190 configured to accept and retain a musical string drawn over and within it. The string receiver 190 is formed on an uppermost portion of the saddle body 170. Front and rear body surfaces 222, 224 extend from opposing ends of the string receiver 190, and taper to meet at a pivot tip 230. In the illustrated embodiment the pivot tip 230 comprises an elongated and straight pivot edge 232 extending in a direction generally normal to an axis of the string receiver 190. The front and back body surfaces 222, 224 preferably meet each other at a tip angle of less than 90°, and more preferably between about 50-85°, and even more preferably between about 75-80°. In the illustrated embodiment, a first extension 234 and a second extension 236 extend outwardly at and adjacent the pivot tip 230 so that the saddle body 170 is much wider along its pivot tip 230 than it is across the string receiver 190.

A body receiver 240 is formed within the saddle assembly base 170 and is configured to receive the saddle body 170 so that the saddle body 170 can pivot within the body receiver 240. The body receiver 240 comprises a front surface 242 and back surface 244 arranged in substantially a V-shape, with the V having an angle greater than the tip angle of the saddle body 170. Most preferably, the V angle is 10-40° greater than the tip angle. As such, the saddle body tip 230 is received and supported by the V, and can pivot over a range substantially without friction about the V.

Figure 26B:
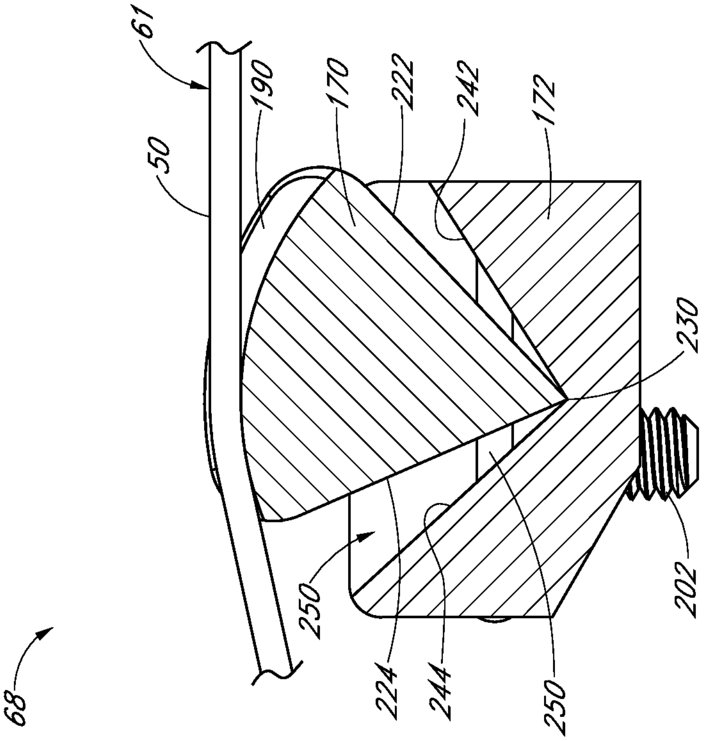
FIG. 26B shows the arrangement of FIG. 26A with the saddle body in a second position.
Figure 26A:
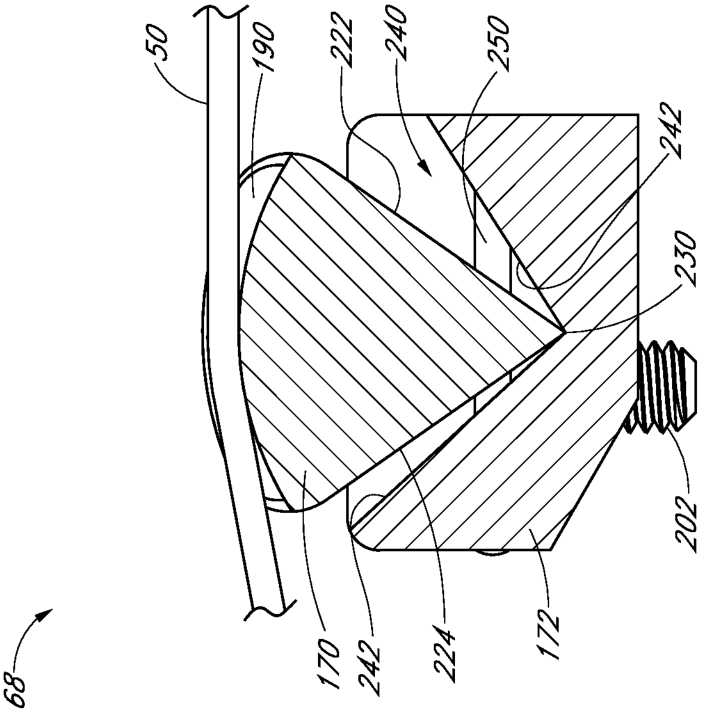
FIG. 26A is a cross-sectional view taken along line 26-26 of FIG. 25, depicting the saddle body in a first position.

In the illustrated embodiment, the string receiver 190 has a constant radius of curvature along its length, and the radius of curvature is taken about the pivot tip 230. As such, and as depicted in FIGS. 26A and 26B, when the musical string 50 is drawn over the saddle body 170 and retained in the string receiver 190, the bending of the string 50 is the same no matter its position along the string receiver 190. As an example of operation, if a musical string 50 and the saddle body 170 is in a first position as depicted in FIG. 26A (and similar to the discussion in connection with FIGS. 9A and 9B), contraction of the string 50 may cause the saddle body 170 to pivot to a second position as depicted in FIG. 26B. During such movement, the saddle body 170 pivots substantially without friction losses, and instead of the string 50 sliding over surface of the string receiver 190, the pivoting saddle body 170 simply supports the string 50 at a different portion along its length. Also, even though the saddle body 170 has pivoted, the string 50 releases from contact with the string receiver surface of the saddle body at substantially the same point relative to the saddle body base 172, which doesn't move. Thus, the playing length of the string 50, and thus intonation, remains the same during elongation or contraction of the string 50.

With reference again to FIGS. 22-25, a retainer passage 248 is formed longitudinally through the saddle body 170. An elongated retainer post 250 is supported by the saddle body base 172 and extends longitudinally across the body receiver 240 and through the saddle body retainer passage 248. Preferably, the retainer passage 248 is sized and shaped to be larger than the retainer post 250 so that the retainer post 250 does not interfere with pivoting of the saddle body 170.

When the string 50 is drawn over the saddle body 170 and tightened into place, a portion of the string force bending over the string receiver urges the saddle body assembly 68 against the frame surface 66. Most preferably the retainer passage 248 is configured to provide sufficient clearance space so that the retainer post 250 never contacts the saddle body 170 during use when a string 50 is drawn over the saddle body 170. If, however, a string breaks or is removed, the retainer post 250 will prevent the saddle body 170 from falling out of the body receiver 240.

As discussed above, during stretching and contracting of the string 50, the force modulation member 70 is configured to rotate with very little friction so as to make adjustments so that the tension applied to the string 50 remains sufficiently constant over an operational range so that the string aurally stays in tune. As is well known, musical notes are generated by vibrations in the playing zone 61, or sounding portion, of the string 50. In the illustrated embodiments, the portions of the string 50 on the opposing side of the nut 46 and string receiver 190 are substantially isolated from the vibrations in the sounding portion. Once plucked, a musical string 50 will continue emitting sound, or will sustain, until vibration stops due to interference with the string by the user or other factors, such as friction, that draw energy from the vibrating string 50. Applicant has determined that a vibrating musical string can actuate back-and-forth rotation (referred to herein as rotational vibration) of the force modulation member 70 on a small scale corresponding to the vibration frequency of the string. While such rotational vibration of the force modulation member 70 does not substantially affect tune of the string, it can act to drain energy from the string, potentially lessening the length of time string vibration is sustained.

Figure 27:
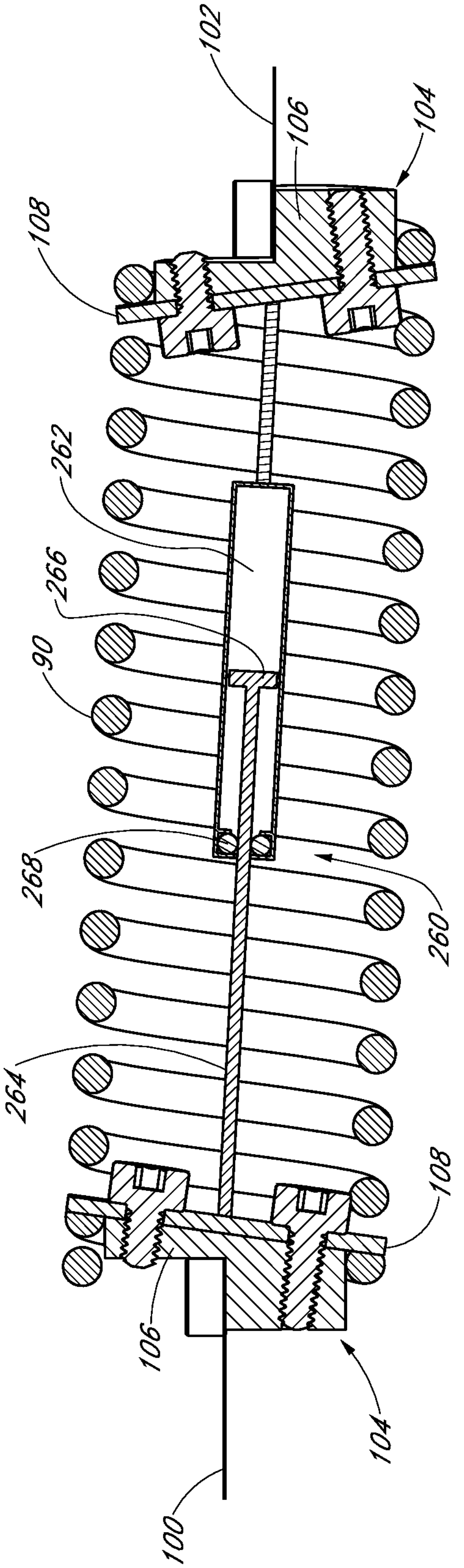
FIG. 27 is a sectional view showing one embodiment of a dampener.
Figure 28:
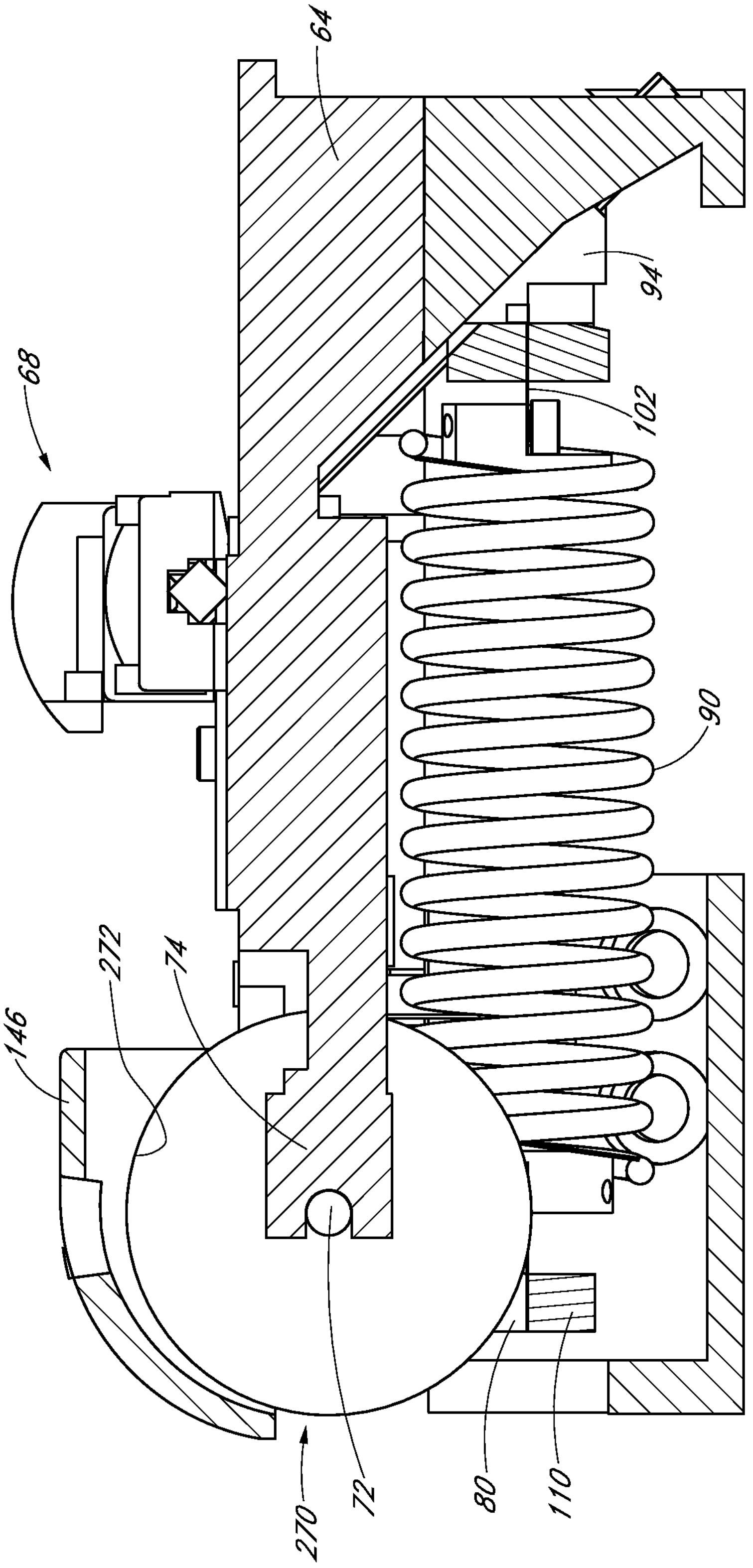
FIG. 28 is a sectional view showing another embodiment of a dampener.
Figure 29:
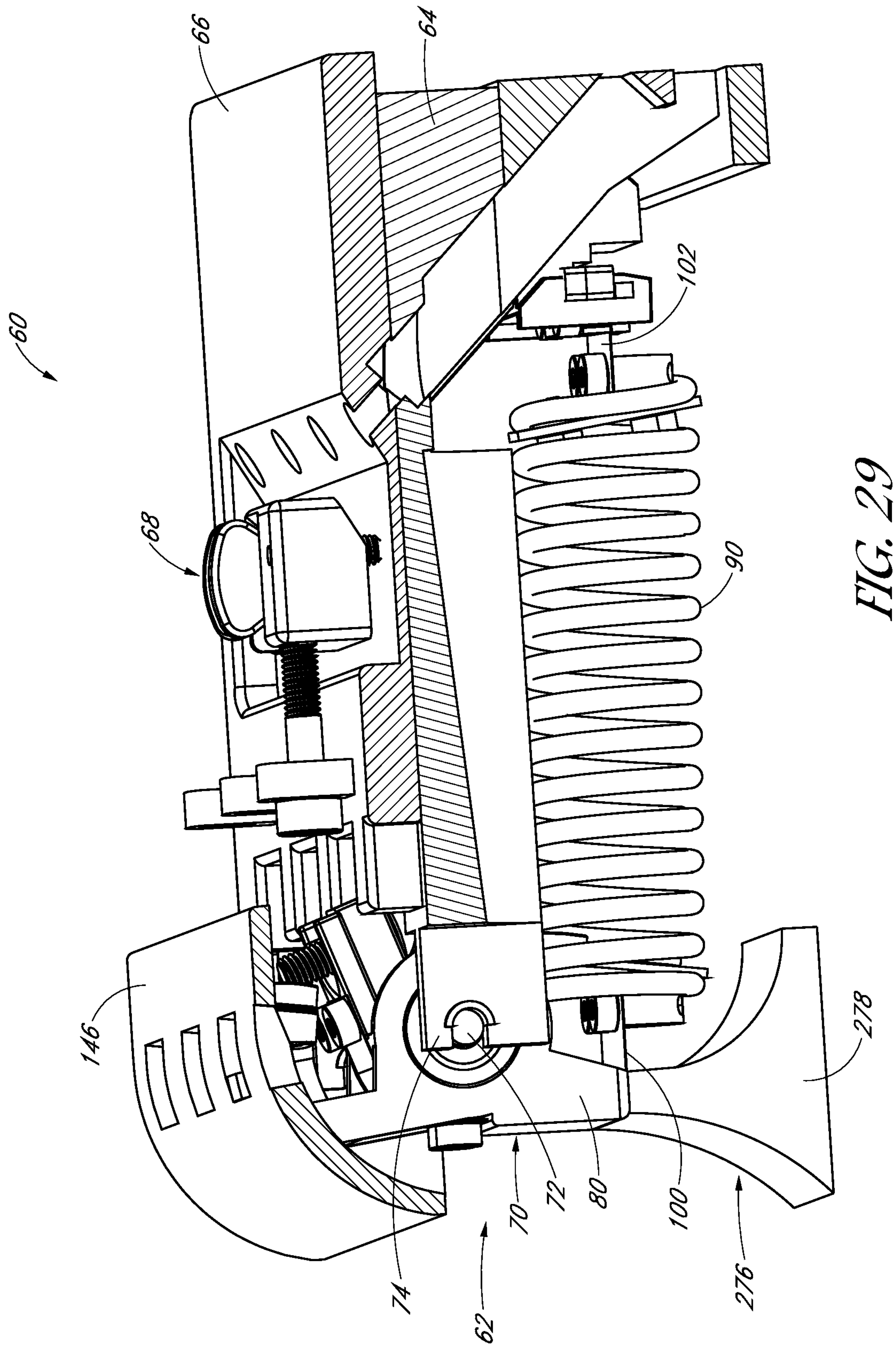
FIG. 29 is a sectional view showing yet another embodiment of a dampener.

With reference next to FIGS. 27-29, in accordance with further embodiments, string holder assemblies 62 may be configured to dampen rotational vibration of the force modulation member 70, preferably without substantially increasing friction that would resist operation of the force modulation member.

With specific reference to FIG. 27, in one embodiment, a mechanical dampener 260 is installed in a string holder assembly 62. In the illustrated embodiment, the mechanical dampener 260 is installed within the coil spring 90. The illustrated mechanical dampener 260 comprises a chamber 262 filled with a fluid and attached to the second coupling 104. A rod 264 extending from the first coupling 104 extends into the chamber 262 and includes a plunger 266. A seal 268 prevents fluid from exiting the chamber 262. In operation, when the force modulation member 70 is prompted to rotate (such as during stretching or contraction of the musical string), the plunger 266 slows, or dampens, the reaction time of the string holder assembly 62. However, the plunger 266 does not prevent or limit full operation of the assembly. During normal operation, in which musical strings elongate or contract relatively slowly, it is expected that the dampener 260 will have substantially no effect on operation.

When a vibrating string 50 would tend to induce rotational vibration to the force modulation member 70 in a first rotational direction, the dampener 260 will slow reaction to the force. Since the vibration is back and forth at high frequencies, the vibrating string 50 would almost immediately switch to induce rotation of the force modulation member 70 in a second, opposite rotational direction. Again, the dampener 260 will slow reaction to the force. Due to such slowed, reaction, rotation of the force modulation member 70 will be reduced if not eliminated by the mechanical dampener 260. As such, little or no energy from the vibrating string will be drawn away by rotational vibration of the force modulation member 70, and sustain of string vibration is preserved.

In the illustrated embodiment, the mechanical dampener 260 is disposed within the coil spring 90. It is to be understood that such a mechanical dampener can have any of many structural configurations and can be placed in other areas of the string holder assembly 62 so as to dampen rotational vibration of the force modulation member 70.

With reference next to FIG. 28, in another embodiment, a weighted member 270 is attached to the force modulation member 70. In the illustrated embodiment, the weighted member 270 comprises weighted wheels disposed on opposite sides of the arcuate surface 136 and configured to rotated with the force modulation member 70. Most preferably, an increased weight is disposed along the outer rim 272 of the weighted wheel 270. As such, due to principles of rotational inertia, the energy requirement to induce rotation of the force modulation member 70 having the weighted wheels 270 is much greater than that for a force modulation member 70 configured as in FIGS. 7 and 8. In this embodiment, the weighted member 270 is considered an inertial dampener. For example, when a vibrating string would tend to rotate the force modulation member 70 in a first rotational direction, the inertial dampener 270 will slow reaction, as more energy is required to induce such rotation. The vibrating string almost immediately switches to apply an opposite force tending induce rotation of the force modulation member 70 in a second, opposite rotational direction. Again, the inertial dampener 270 will slow reaction to the applied force. Due to such slowed reactions, rotation of the force modulation member 70 to vibration will be reduced if not eliminated by the inertial dampener 270. As such, little or no energy from the vibrating string 50 will be drawn away by rotational vibration of the force modulation member 70, and sustain of string vibration is preserved. However, during string changes that involve a consistent force change applied over a comparatively long period of time, rotational speed is a less-significant factor, and the inertial dampener 270 will allow full and unrestricted adjustment operation of the string holder assembly 62.

In the embodiment discussed in connection with FIG. 28, the weighted member 270 is a weighted wheel with weight distributed substantially evenly about the axle 72 of the force modulation member 70. With reference next to FIG. 29, in another embodiment, a weighted member 276 may not be evenly distributed about the axle 72. In this embodiment, the weighted member comprises a slug 278 attached to the modulation arm 80 of the force modulation member 70. In the illustrated embodiment, attachment of the slug 278 greatly increases the rotational inertia of the force modulation member, and comprises an inertial dampener 276 operating along similar principles as discussed above. It is to be understood that inertial dampeners having many different sizes, shapes, and configurations can be employed in additional embodiments to increase the rotational inertia of the force modulation member 70 and/or other structures of the string holder assembly 62.

Inventive principles have been presented herein in the context of a stringed musical instrument, and specifically a 4-string guitar 30. However, it is to be understood that the principles discussed herein can be employed with other stringed musical instruments, such as 6- or 12-string guitars, other handheld string instruments such as cellos, violins and the like, and heavy stringed instruments such as pianos. The principles discussed herein can also be employed in other contexts, such as in constant tension devices and/or devices in which spring alignment is desired.

The embodiments discussed above have disclosed structures with substantial specificity. This has provided a good context for disclosing and discussing inventive subject matter. However, it is to be understood that other embodiments may employ different specific structural shapes and interactions.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A stringed musical instrument, comprising:
- a musical string having first and second ends;
- a first receiver adapted to receive the first end and hold the first end in a position;
- a string mounting system having a second receiver adapted to receive the second end, the second receiver being movable toward and away from the first receiver, the string mounting system having a contact portion that moves with the second receiver; and
- a stop that does not move with the second receiver, the stop interposed in a path of the contact portion so as to prevent the contact portion from moving toward the first receiver past the stop;
- wherein the stop comprises a flexible member supported on at least one side of the path of the contact portion.

2. The stringed musical instrument of claim 1, wherein the flexible member comprises a plate.

3. The stringed musical instrument of claim 2, wherein the flexible member comprises a plurality of plates stacked on one another.

4. The stringed musical instrument of claim 2, wherein the plate comprises a spring steel plate having a thickness between about 0.002-0.004 inches.

5. The stringed musical instrument of claim 1, wherein the string mounting system is configured to hold the musical string at a perfect tune tension when the contact portion is spaced from the stop, and wherein the stop is configured to deflect more than 0 mm and less than about 1 mm when the contact portion is engaged with the stop and a tension applied to the musical string is between about 35-50% more than the perfect tune tension.

6. The stringed musical instrument of claim 1, additionally comprising a bumper extending outwardly from a surface of the contact portion toward the stop.

7. The stringed musical instrument of claim 1, wherein the flexible member is supported by first and second mounts disposed on opposite sides of the path of the contact portion, and the flexible member is unsupported between the first and second mounts.

8. The stringed musical instrument of claim 7, wherein the contact portion is positioned to contact the flexible member between the first mount and the second mount so that the flexible member can deflect.

9. The stringed musical instrument of claim 1, wherein the stop is interposed between the second receiver and the contact portion.

10. The stringed musical instrument of claim 1, additionally comprising a frame having a view slot with a front end and a back end, wherein the contact portion is disposed within the view slot and the stop is positioned at the front end.

11. The stringed musical instrument of claim 1, wherein the string mounting system comprises a spring assembly that applies a tension to the second end of the string so as to hold the string at the perfect tune tension, the string mounting system configured so that the string tension remains within a desired tension range defined about the perfect tune tension when the second receiver moves within a desired position range defined about a perfect tune position, the desired tension range corresponding to a range of string tension around the perfect tune tension in which any change in the tune of the vibrating string is not aurally detectable.

12. The stringed musical instrument of claim 11, wherein the stop is positioned so that the second receiver is within the desired position range when the contact portion engages the stop.

13. The stringed musical instrument of claim 12, wherein the spring assembly comprises a force modulation member configured to pivot when the second receiver moves toward or away from the first receiver, and wherein the contact portion is configured to pivot with the force modulation member.

14. The stringed musical instrument of claim 13, wherein at least a portion of the stop is coated with an elastomeric coating.

15. A method of sounding a musical string having a first end held at a position of a stringed musical instrument by a first receiver and a second end received by a second receiver that is part of a string mounting system of the stringed musical instrument, comprising:
- causing the musical string to vibrate;
- bending the musical string so as to draw the second receiver toward the first receiver, wherein when the second receiver moves toward the first receiver a contact portion of the string mounting system is brought into contact with a stop; and
- further bending the musical string after the contact portion is in contact with the stop so that the tension in the musical string increases;
- wherein when the tension in the musical string increases the top deflects toward the first receiver.

16. The method of claim 15, wherein the stop stays in contact with the contact portion over a range of musical string tension.

17. The method of claim 15, wherein the stop is configured to deflect up to 3 mm when the tension in the musical string increases to be 35-50% greater than a perfect tune tension of the musical string.

* * * * *